United States Patent [19]

Johanson et al.

[11] Patent Number: 5,051,912
[45] Date of Patent: Sep. 24, 1991

[54] VECTORING/ORBITING CONTROL UNIT FOR ELECTRICAL DISCHARGE MACHINING

[75] Inventors: Lars Johanson, Cedar Grove; Frank J. Bonavita, Carlstadt, both of N.J.; Ralph E. Rudnick, Chester, Va.

[73] Assignee: Hurco Acquisition Corporation, Indianapolis, Ind.

[21] Appl. No.: 306,970

[22] Filed: Feb. 7, 1989

[51] Int. Cl.[5] ............ G06F 15/46; G05B 9/02
[52] U.S. Cl. .................. 364/474.04; 364/188; 364/189; 364/474.22
[58] Field of Search ........... 364/188, 189, 474.04, 364/474.22, 474.26, 474.24–474.27, 474.11, 474.23, 474.18; 219/69.1, 69.16, 69.11, 69.2, 474.34; 318/570, 572

[56] References Cited

U.S. PATENT DOCUMENTS

| | | | |
|---|---|---|---|
| 4,150,275 | 4/1979 | Wavre | 219/69.2 |
| 4,332,995 | 6/1982 | Ito et al. | 219/69.2 |
| 4,365,300 | 12/1982 | Johanson et al. | 364/474 |
| 4,495,394 | 1/1985 | McGregor et al. | 219/69.11 |
| 4,646,228 | 2/1987 | Ikeda | 364/474.26 |
| 4,685,064 | 8/1987 | Kinoshita et al. | 364/474.04 |
| 4,703,146 | 10/1987 | Kinoshita | 364/474.34 |
| 4,713,517 | 12/1987 | Kinoshita | 318/570 |
| 4,723,207 | 2/1988 | Isobe et al. | 364/474.22 |
| 4,736,086 | 4/1988 | Obara | 318/570 |
| 4,788,636 | 11/1988 | Shiratori et al. | 364/474.23 |
| 4,823,253 | 4/1989 | Shima et al. | 364/474.22 |
| 4,837,703 | 6/1989 | Kakazu et al. | 364/474.18 |
| 4,855,898 | 8/1989 | Kawamura | 364/474.11 |

Primary Examiner—Jerry Smith
Assistant Examiner—Jim Trammell
Attorney, Agent, or Firm—Woodard, Emhardt, Naughton, Moriarty & McNett

[57] ABSTRACT

A vectoring and orbiting control unit for electrical discharge machines (EDM). The unit is an adjunct to conventional EDM machines having a microprocessor-controlled electrical power supply/control unit that includes a gap detector/processor, position detector, and z-axis translator. The vectoring and orbiting control unit controls the electrode movement in the x-y, or polar, coordinate plane directly, and provides z-axis command data to the system controller of the power supply/control unit, the latter capable of moving the electrode along a z-axis. The vectoring and orbiting control unit displays a menu of various canned vectoring and orbiting modes available, permits the operator to select a desired mode, and enables the operator to input, in a verifiable, user-friendly manner, various machining values consistent with the mode selected by the operator.

19 Claims, 22 Drawing Sheets

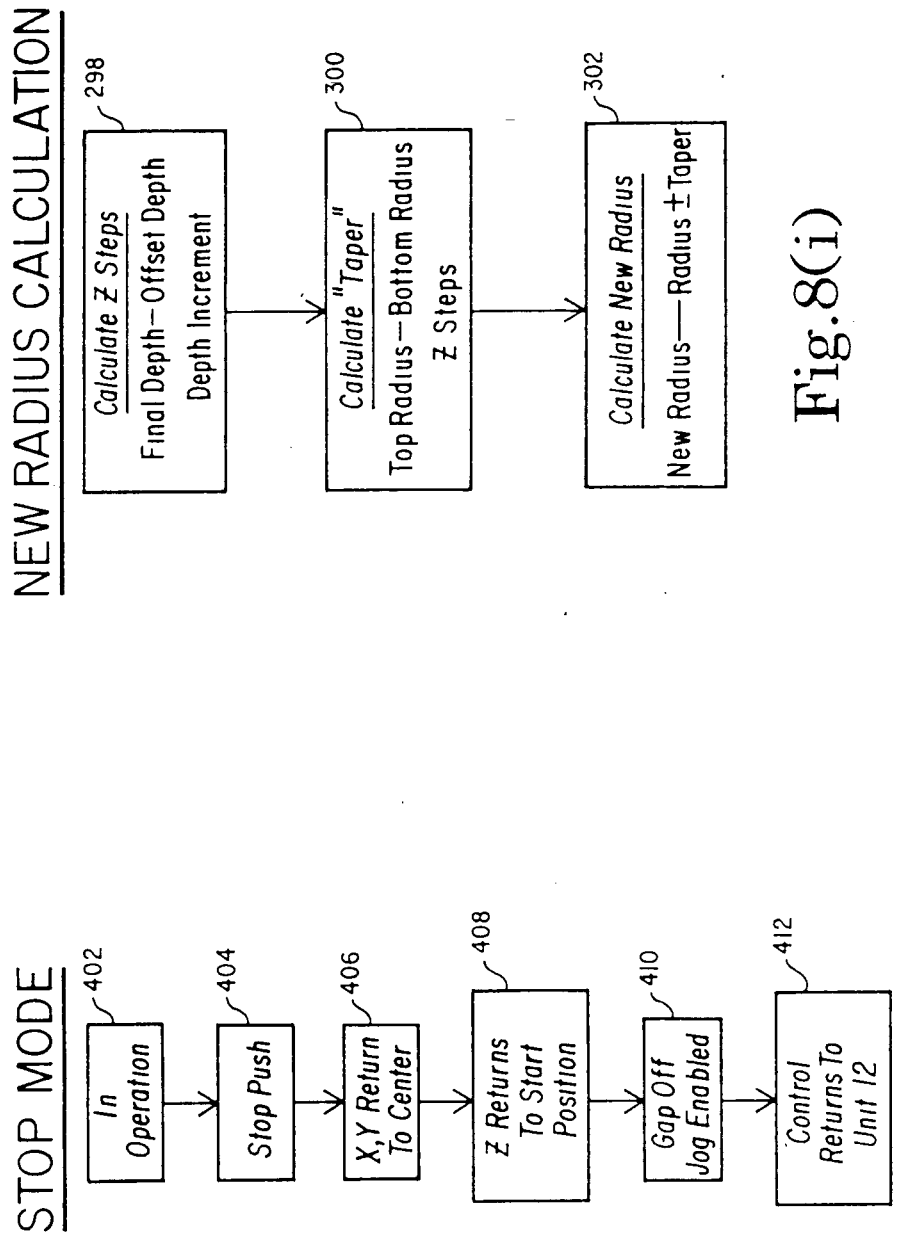

VECTORING/ORBITING CONTROL UNIT FOR ELECTRICAL DISCHARGE MACHINING

BACKGROUND OF THE INVENTION

1. Field of the Invention

The present invention relates to a method and apparatus for vectoring and orbiting machine control. More specifically, the invention relates to a method and apparatus for orbiting/vectoring machine control employing a new technique of machine tool control in performing electrical discharge machining (EDM).

2. Description of the Prior Art

In the past, electrical discharge machining had been accomplished by an operator who empirically moved an electrode with respect to a workpiece-carrying work table. In such a conventional approach, machining largely depended on the operator's dexterity, and such techniques were unfit for achieving high precision machining. Such conventional approaches were not effective for enabling complicated work patterns, or at least did not achieve the same in an efficient manner.

As electrical technology became more sophisticated, arrangements were developed wherein the paths of the electrode were controlled by means of electrical control circuitry coupled with servo motor control. Moreover, mechanical and analog signal processing techniques have, for some time, been employed in controlling EDM arrangements. Again, such techniques were relatively simplistic and, as a result, machining had been carried out in a rather unsophisticated, imprecise and inefficient manner. More specifically, EDM control techniques were such that only relatively simple types of machine patterns were able to be carried out.

With the advent of microprocessor-controlled technology, systems and methods were developed for providing a more sophisticated control of the relative movement of the electrode and workpiece in order to machine complex shapes in an efficient manner. One such technique is described in U.S. Pat. No. 4,365,300, assigned to the same assignee as the instant invention. In that patent, a method and apparatus for vector machine control of a tool and a workpiece was described using microprocessor-based technology. Specifically, the system included a dual microprocessor arrangement to control the complete movement of the electrode with respect to a workpiece in both the downward, or z-axis, direction as well as in a transverse polar coordinate plane. In such a system, information was inputted by an operator and such information was displayed on an oscilloscope located on the front panel of the unit. In this patent, one of the microprocessors controlled the manual input and display functions as well as the z-axis control function. The other microprocessor monitored the gap voltage and provided signals to a polar translator for movement of the electrode in the polar coordinate plane via x-axis and y-axis stepping motors. The system of the patent was relatively effective for controlling the basic electrical discharge machine, albeit in a relatively slow and inefficient manner.

Recent advances in the EDM field have resulted in more sophisticated EDM machines which are themselves microprocessor controlled having their own system controller for controlling the z-axis movement and the overall electrical machining. For example, the Eltee Pulsitron Model TRM-21 electrical discharge machine, used in conjunction with an Eltee Pulsitron Model EP300 CP electrical power supply/control system is one such well-known sophisticated EDM system. The electrical discharge machine (TRM-21) includes a work table for supporting the workpiece to be machined and a tool holder, or head, for moving the tool in the z-axis direction under the control of the power supply/control system (EP300CP). The power supply/control system includes a system controller which controls the movement of the tool in the z-axis direction, detects the position of the tool with respect to the workpiece, and controls a gap detector/processor for providing gap voltage across the tool and the workpiece in a manner well known in the art. However, such a system does not provide for orbiting and vectoring of the tool relative to the workpiece under control of the system controller to enable complex shapes to be machined in a user-friendly manner. Accordingly, a need has arisen for a vectoring and orbiting control unit, readily adaptable for the sophisticated EDM machine systems and power supply/control systems now on the market such as the TRM-21 EDM machine used in conjunction with the EP300 CP power supply, taking advantage of the relatively sophisticated microprocessor controlled machining capabilities of such units.

SUMMARY OF THE INVENTION

The present invention relates to a vectoring and orbiting control unit as an adjunct to microprocessor-controlled EDM machines of the type described above. The vectoring and orbiting control unit uses the system controller of the known EDM machine systems to provide an efficient high-speed system. The vectoring and orbiting unit of the present invention includes a single microprocessor system, with separate arithmetic and video processors, resulting in a system which is more time-responsive, user-friendly, and capable of achieving sophisticated types of EDM machining.

Specifically, the vectoring and orbiting control unit of the present invention includes a communication link with the microprocessor-based system controller of the EDM machine power supply/control unit to provide z-axis command data thereto. The EDM machine power supply/control unit, in response to such command data, controls the electrode movement in the z-axis direction. Similarly, the EDM machine power supply/control unit provides position data via the communication link to the vectoring and orbiting control unit microprocessor. The vectoring and orbiting control unit of the present invention also receives gap voltage signals from the gap detector/processor of the EDM machine power supply/control unit, thus eliminating the necessity for any separate gap processing system in the vectoring and orbiting control unit.

The vectoring and orbiting control unit of the present invention is electrically connected to the cross-slides of the electrode tool support on the EDM machine and provides x-axis and y-axis control signals directly thereto to move the electrode in accordance with input information provided by the operator.

The vectoring and orbiting control unit of the present invention includes a video display cathode ray tube for displaying predetermined vectoring and orbiting modes of operation. In operation, the operator of the system calls up a menu of various vectoring and orbiting control modes, selects the particular vectoring and orbiting mode desired, and provides input information in accordance with instructions displayed on the CRT. This provides instant verification to the operator and enables input information to be provided without any sophisticated programming knowledge.

Thus, it is an object of the present invention to provide a vectoring and orbiting machine control unit as an adjunct to well-known microprocessor-based EDM machine systems wherein the responsibility for the respective functions to be provided is divided between the vectoring and orbiting machine controller and the EDM machine system controller. Specifically, it is an object of the present invention to provide a vectoring and orbiting control unit that controls the movement of the electrode in the x-y plane in accordance with input information provided by the operator, while using the conventional position detector of the EDM machine system and the conventional gap voltage detector/processor of the EDM machine. Further, it is an object of the present invention to move the electrode in the z-axis by providing z-axis command data to the system controller of the EDM machine, which, in turn, provides the direct control signals to move the electrode in the z-axis direction.

It is an additional object of the present invention to provide a method and apparatus for vector and orbiting machine control wherein there is provided a vectoring/orbiting machine controller having a sophisticated operator system interface which provides not only rapid manual data input, through video menu screens, but also highly responsive input and status data display.

The above and other objects that will hereinafter appear, and the nature of the invention, will be more clearly understood by reference to the following description, the appended claims, and the accompanying drawings.

BRIEF DESCRIPTION OF THE DRAWINGS

FIG. 8(h) is a flowchart of the Stop mode program.

FIG. 8(i) is a flowchart of the New Radius Calculation program.

DETAILED DESCRIPTION OF A PREFERRED EMBODIMENT

The vectoring and orbiting control unit of the present invention will now be described in detail with reference to the figures of the drawings.

Figure 1:
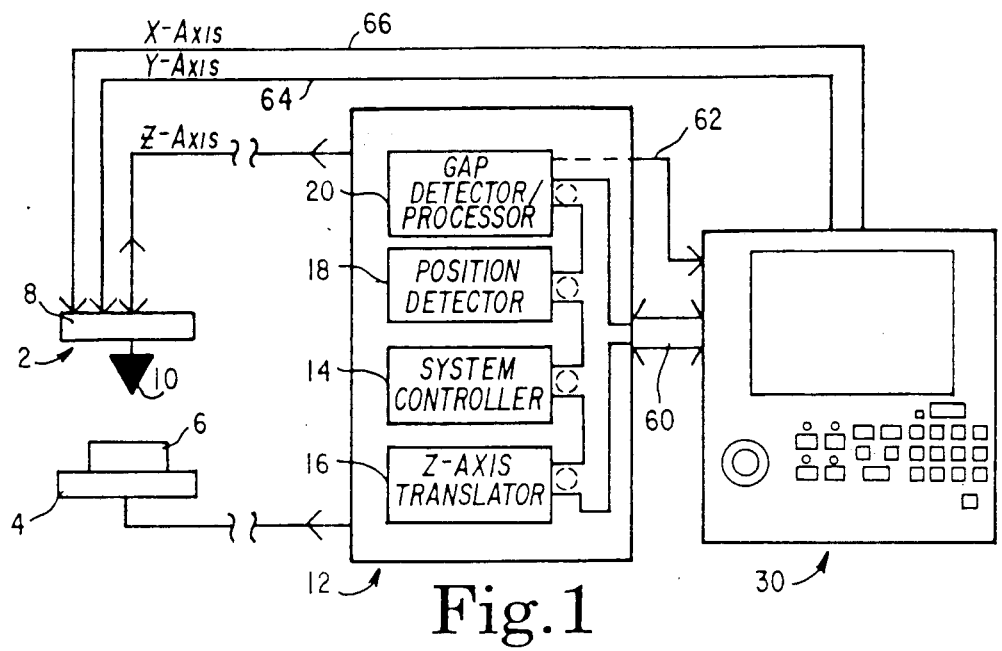
FIG. 1 is a general block diagram of the EDM machine, the power supply/control unit, and the vectoring and orbiting control unit of the present invention.

FIG. 1 is a general block diagram showing the three major components of the EDM machine system including the novel vectoring and orbiting control unit 30 of the present invention. The overall system includes an EDM machine electrode and workpiece support system which is the mechanical system for mechanically supporting and moving an electrode 10 with respect to a workpiece 6. This support system 2 includes a table 4 for supporting the workpiece 6. The electrode 10 is mounted on a tool holder or head 8 which includes x-axis and y-axis cross slides (not shown) for moving the electrode 10 in x-axis and y-axis directions in a manner to be described. The head 8 is also movable in a z-axis direction, i.e., in a direction toward the workpiece 6. This is the basic EDM machine and is well-known in the art. One such EDM machine suitable for the present invention is the TRM 21 system of Eltee Pulsitron. Such a system is modified to include stepping motors for moving the cross slides in small incremental steps in the x-axis and y-axis directions in accordance with control signals provided by the vectoring and orbiting system 30. The use of stepping motors to move an electrode mounted to cross slides is also well known in the art.

The EDM machine mechanical unit 2 operates in conjunction with an electrical power supply/control system 12. The system 12 is a microprocessor-controlled system which controls the movement of the electrode tool with respect to the workpiece in a vertical or z-axis direction and provides gap cutting voltage pulses across the gap formed by the electrode and the workpiece in a manner well known in the art. One such electrical power supply/control system particularly adaptable for the present invention is the EP 300 CP, manufactured by Eltee Pulsitron.

Insofar as pertinent to the present invention, the power supply/control system 12 includes a z-axis translator 16 which, under the control of a microprocessor-based system controller 14, moves the electrode head 8 in the z-axis direction. The power supply/control system 12 also includes a position detector 18 which detects the position of the electrode tool in the z-axis direction and provides such data to the system controller 14. Further, the system 12 includes a gap detector/processor unit 20 which provides gap voltage signals across the tool and the workpiece to provide the machining operation, as is well known in the art. Thus, the electrical power supply/control system 12 can control the movement of the electrode 10 with respect to the workpiece 6 in the z-axis direction and provides gap voltage under servo control as is well known in the art.

Figure 3:
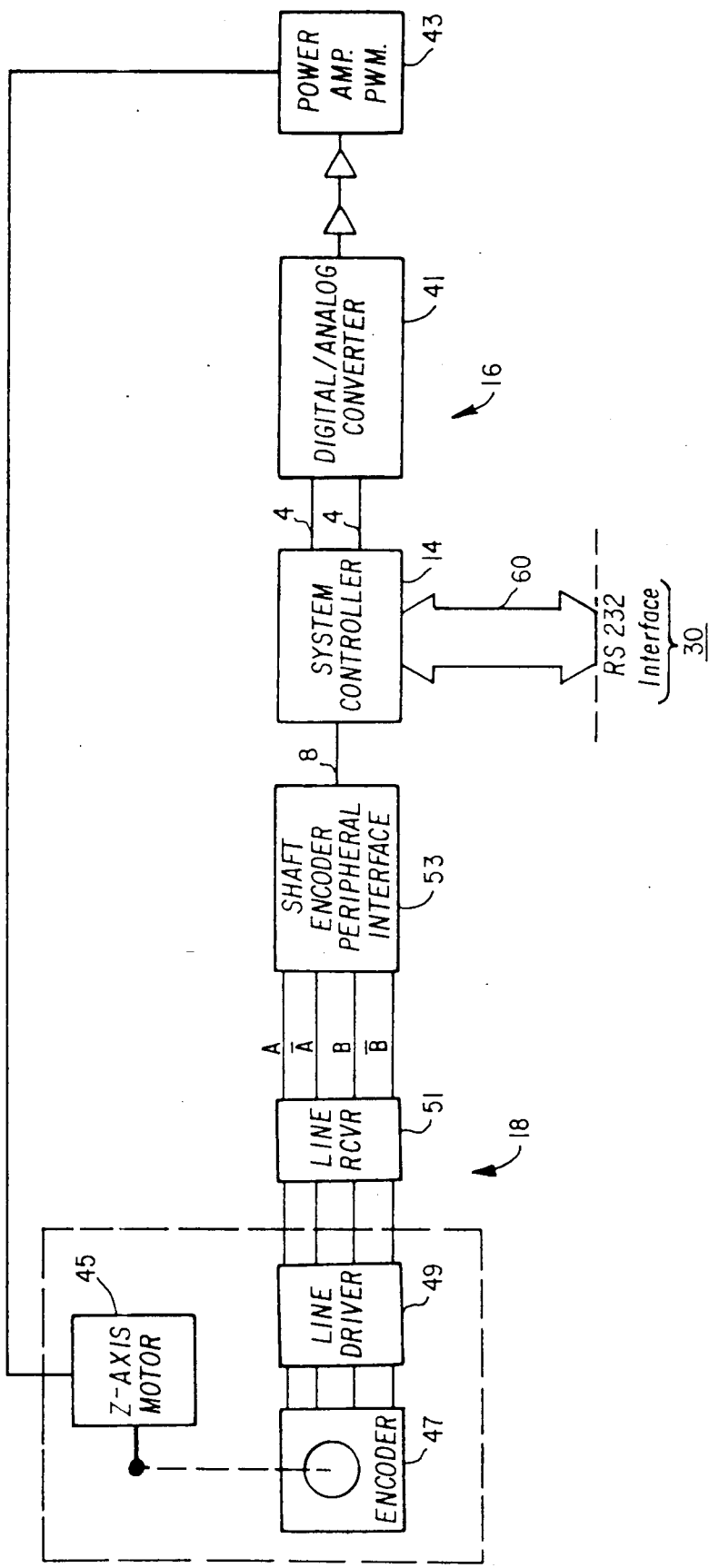
FIG. 3 is a general block diagram of the z-axis translator, position detector, and system controller of a conventional power supply/control unit.

The various components 14-20 of the power supply/control system 12 are well-known in the EDM art. For example, the z-axis translator 16, the position detector 18, and the gap detector/processor 20 may be the same as those shown in the above-referenced U.S. Pat. No. 4,365,300. Preferred embodiments of the z-axis translator 16 and position detector 18, and their relationship to the system controller 14, is shown in FIG. 3. The system controller 14 provides z-axis control data to a digital to analog converter 41 which converts the digital data words into an analog output. The analog output is provided to a pulse width modulated power amplifier 43 which in turn is connected to the z-axis stepping motor 45 to activate the motor 45 in a given direction. The motor 45 is preferably a DC servomotor which is connected to the head 8 to move the head along the z-axis (not shown). The z-axis position detector 18 includes an encoder 47 which is integral with the z-axis motor. The encoder 47 has 1,000 lines per revolution with two channel quadrature outputs buffered by line driver 49. The buffered quadrature signals are provided to line receivers 51 which convert a differential input to single ended outputs and provide such outputs to a shaft encoder peripheral interface 53. This interface 53 is designed for a standard 2-phase incremental encoder (either rotary or linear) for interfacing with a microprocessor or microcomputer such as system 14. The line receivers 51 accept two-phase incremental encoder signals, perform the quadrature detection, and count the number of incremental encoder pulses in an internal 8-bit up/down counter (not shown). A separate hardware latch latches the exact count in the 8-bit up/down counter when either an index pulse or an external event pulse occurs, providing a means for very accurate absolute positioning. The direction detection and up/down count accumulation result in a two's complement number that is directly readable by the system controller microprocessor 14. The data provided can then be used in calculating the acceleration, velocity, and position of the incremental encoder, if desired.

The gap detector/processor 20, as is well-known in the EDM art, provides voltage signals across the gap formed by the electrode and workpiece. The gap detector/processor 20 operates in conjunction with the system controller 14 and z-axis translator 16 to provide a servo control in a manner well-known in the art. For example, if a short develops across the gap, the system controller 14 detects the gap voltage condition and provides control signals to the z-axis translator to retract the electrode until the gap is cleared. The electrode is then advanced back toward the workpiece under this conventional servo control.

The system 12 as described above and shown, in part, in FIG. 3, is part of the prior art EP300CP system and forms no part of the present invention by itself. As will be described further below, however, the system controller 14 of the power supply/control unit 12 interfaces with an RS 232 communication link interface to communicate with the vectoring and orbiting control unit 30. As will be described, the vectoring and orbiting control unit 30 provides z-axis command data to the system controller 14 to instruct the system controller 14 to move the electrode in the z-axis direction. Further, the system controller 14 provides z-axis position data, via the RS 232 interface, to the vectoring and orbiting control unit 30.

Referring back to FIG. 1, the vectoring and orbiting control unit 30 of the present invention interacts with, and is an adjunct to, the EDM machine 2 and the electrical power supply/control system 12 to enable desired EDM vectoring and orbiting operations to take place. The vectoring and orbiting control unit 30 interacts with, and is connected to, the EDM machine 2 and the power supply/control system 12 in the following manner. First, the vectoring and orbiting control unit 30 communicates with the power supply/control system 12 through a RS232-C communication link 60. The vectoring and orbiting control unit 30 provides z-axis command data to the system controller 14, which in turn activates the z-axis translator 16 in accordance with the command data provided via the communication link 60. The position of the electrode in the z-axis is provided over the communication link 60 from the system controller to the vectoring and orbiting control unit 30. The vectoring and orbiting control unit 30 is also connected, via line 62, to receive analog gap voltage signals from the gap detector/processor 20, in a manner to be described. Further, the vectoring and orbiting control unit 30 provides x-axis and y-axis control signals, via lines 64, 66 to the x and y stepping motors associated with the cross slides of the machine tool head 8.

Thus, the vectoring and orbiting control unit 30 controls the movement of the electrode 10 in the x-axis and y-axis direction, i.e., in the polar coordinate plane, directly. The power supply/control unit 12 moves the electrode in the z-axis direction. The vectoring and orbiting control unit 30 provides z-axis command data over the communication link 60 to instruct the system controller 14 of the power supply 12 to move the electrode in the z-axis direction.

Similarly, cutting voltage across the gap is provided by the gap detector/processor 20, in the conventional manner, regardless of whether the electrode 10 is moved in the z-axis direction, the x-y plane, or both planes simultaneously. The servo control is controlled by both systems, however. The system controller 14 receives gap voltage signals from the gap detector/processor 20, in a manner known in the art and described generally above, for providing automatic servo control in the z-axis direction. Similarly, the vectoring and orbiting control unit 30 receives the same gap voltage signal, via line 62, and, under control of a microprocessor, to be described below, provides servo control of the x-y stepping motors. The system is designed so that if a short is detected, the x-y motors are first retracted. If the short is not cleared, then the z-axis motor is activated to retract along the z-axis. If the short is then cleared, the system returns in the reverse order. If the short fails to clear, the gap voltage is automatically turned off, until manual inspection can occur.

Figure 2:
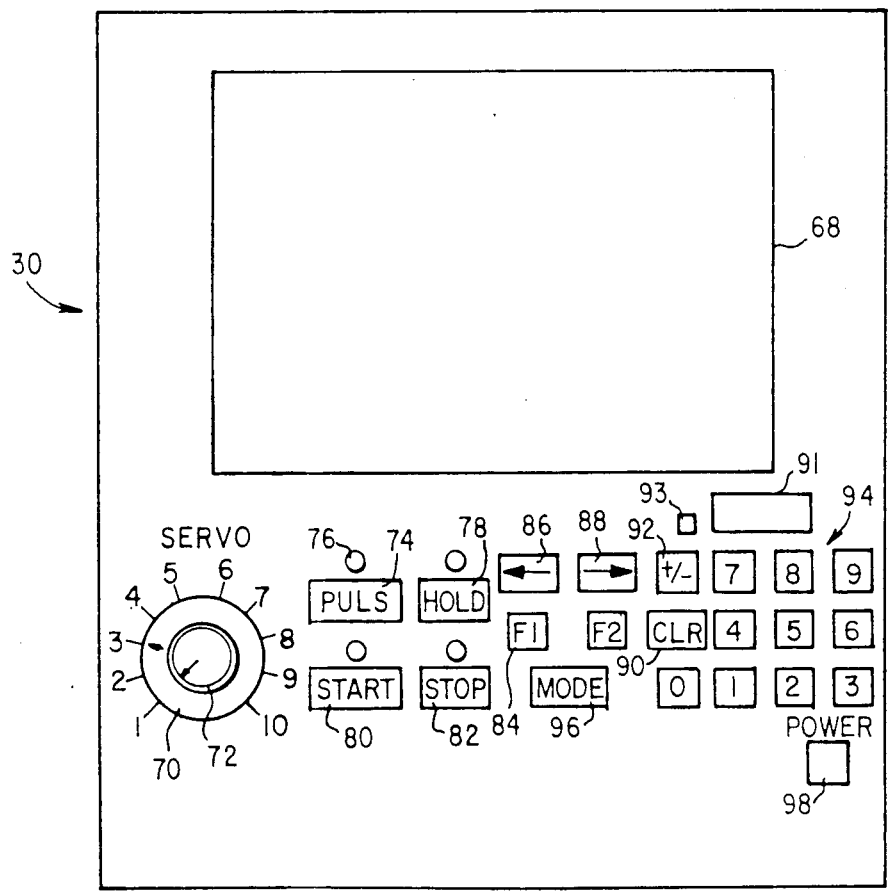
FIG. 2 is the front panel of the vectoring and orbiting control unit.

FIG. 2 is a representation of the front control panel of the vectoring and orbiting control unit 30. The unit 30 includes a CRT screen 68 as a video display for displaying various items to be described below. The screen 68 is a standard off-the-shelf high resolution monitor. Located below the monitor 68 are various control keys, knobs, and indicators for system operation.

Knob 70 is a gap voltage knob used by the operator to adjust the gap voltage level. This sets the cutting gap voltage. Knob 72 is the servo gain, or rate, control knob which controls the gain of the servo. (The servo gain is often referred to as the feed rate control.) When a cutting process is taking place, the gain control knob 72 acts to regulate a window within which the cutting voltage is allowed to vary. For example, if the cutting gap voltage is set to a particular value, say 30 volts, the cutting gap voltage will be allowed to vary from the 30 volts to a plus/minus value as set by the knob 72.

The PULS key 74, when depressed, provides for a pulsating physical movement along the cutting axis. That is, a reversal in movement of the electrode away from the cut for a particular time duration is provided. Once the reversal time has elapsed, the electrode will return to the cut. When the key 74 is depressed, a light emitting diode 76 is toggled on.

The HOLD key 78, when depressed, will temporarily stop the operation being performed. If the x or y axes are off center, they will return to center, the z-axis will return to the start position, and the cutting power will be turned off. The system will remain in this state until the HOLD key is depressed again to release this function. Then, the electrode is moved back to where it left off and gap voltage resumes. The HOLD key also has, associated with it, a light emitting diode.

The START key 80, when depressed, will begin the cycle for the operation that was selected. If a cutting operation was selected, the cutting power will automatically turn on and machining will begin. The START key has an LED associated with it.

The STOP key 82, when depressed, will stop the operation currently being performed. The x-y axis will first return to the center of the cavity and the z-axis will return to the start of the cut position. Then all functions will stop.

The F1 key 84 is used to set the z-axis to zero. When the electrode is touching the top of the workpiece during depth finding, the F1 key is depressed to zero-out the z-axis position. All the z-axis depth measurements will be referenced from that point.

The F2 key is used to convert data to the metric system.

The arrow keys 86, 88, control an address cursor on the video screen 68. The address cursor will be found in various places depending upon which screen is presently displayed, as will be described further below.

The CLR key 90 is used to clear the entered data. The plus/minus key 92 is used to change polarity of the data. The ten keys, nos. 0-9, 94, are used to enter numerical data.

Figures 7A, 7B:
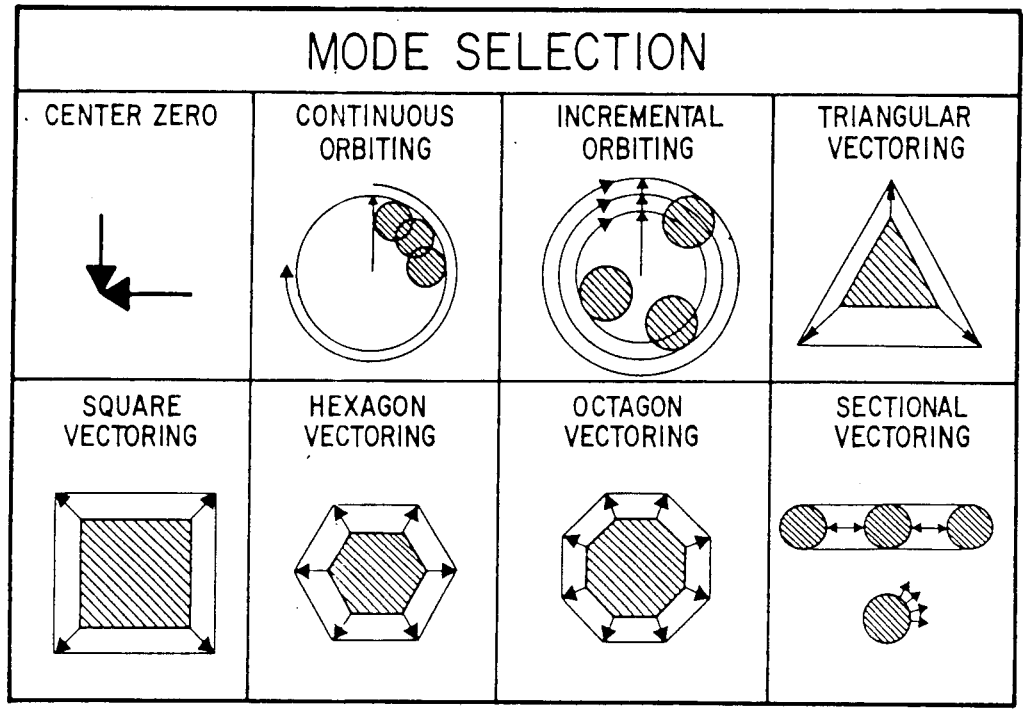
FIG. 7(a) is a video display screen depicting the mode selection menu page.
FIG. 7(b) is a video display screen depicting the Center Zero mode screen.

The MODE key 96 has two functions. When the MODE page is displayed on the screen (page as shown in FIG. 7(a)), the MODE key is used to select the mode desired. When not on the mode page, by depressing the MODE key, the mode page will be displayed The POWER button, 98, is the main power button for the unit 30. This turns the power on and off. Button 91 is the power button for the screen 68.

All of the above described keys are membrane type switches for numerical and operational data input. The use of membrane switch technology for manual data input, as opposed to hardwire switches, result in many advantages. One important advantage is that they are sealed against any contaminants, thereby enhancing reliability.

Figure 4:
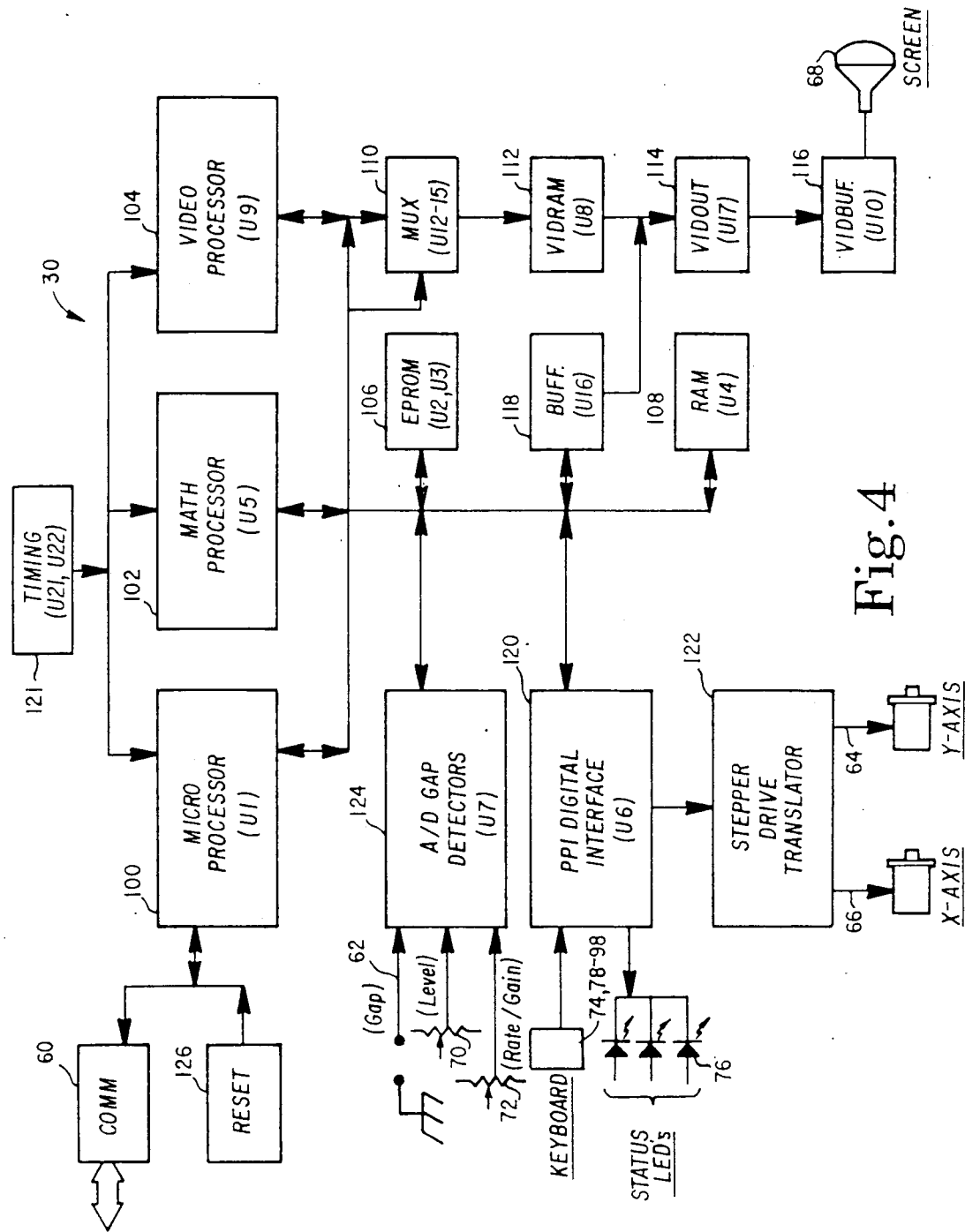
FIG. 4 is a block diagram of the system components of the vectoring and orbiting control unit.
Figure 5:
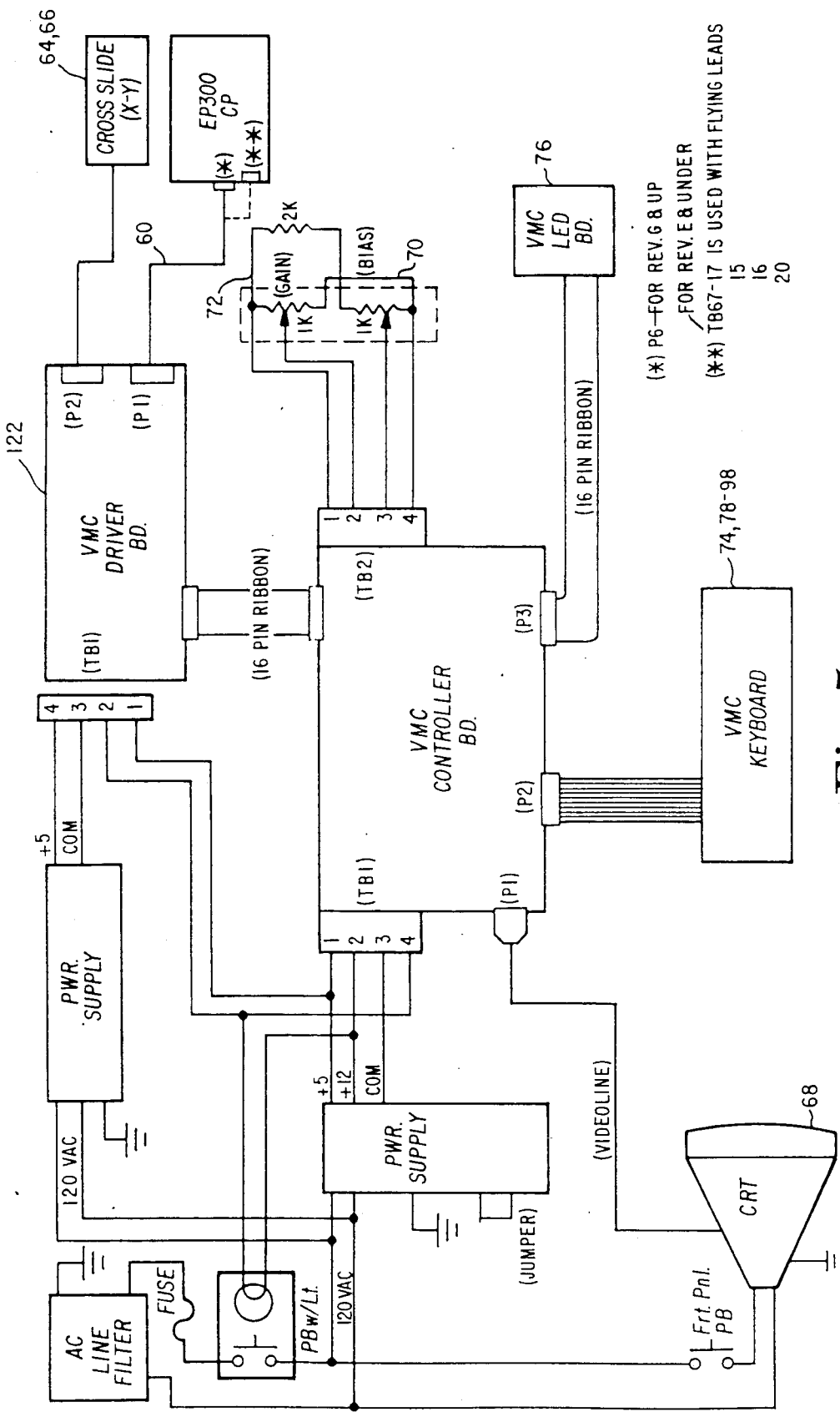
FIG. 5 is a wiring diagram of the circuit boards for the system of FIG. 4.
Figure 6:
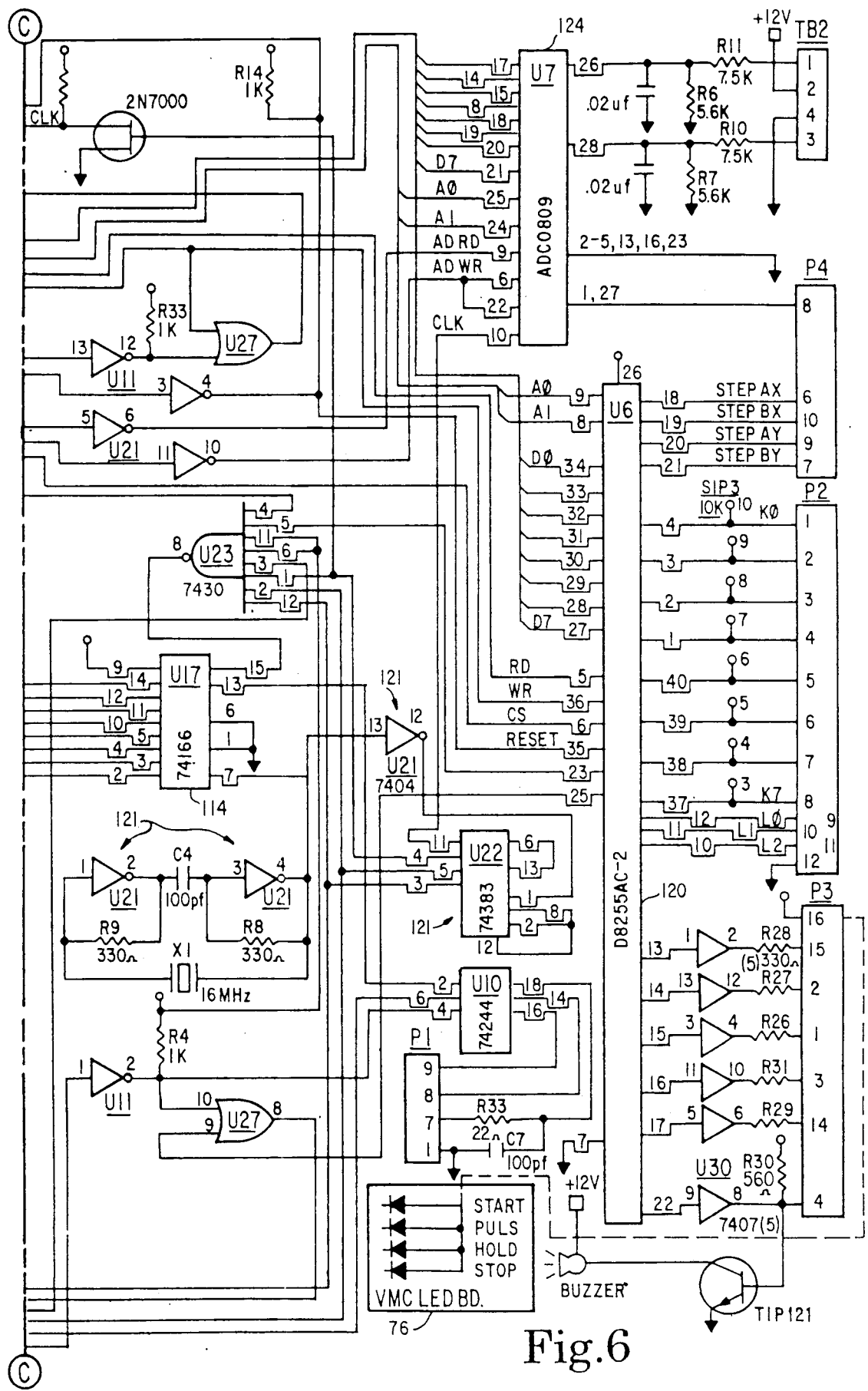
FIG. 6 is a wiring diagram of portions of the circuit boards of FIG. 5.
Figure 6A:
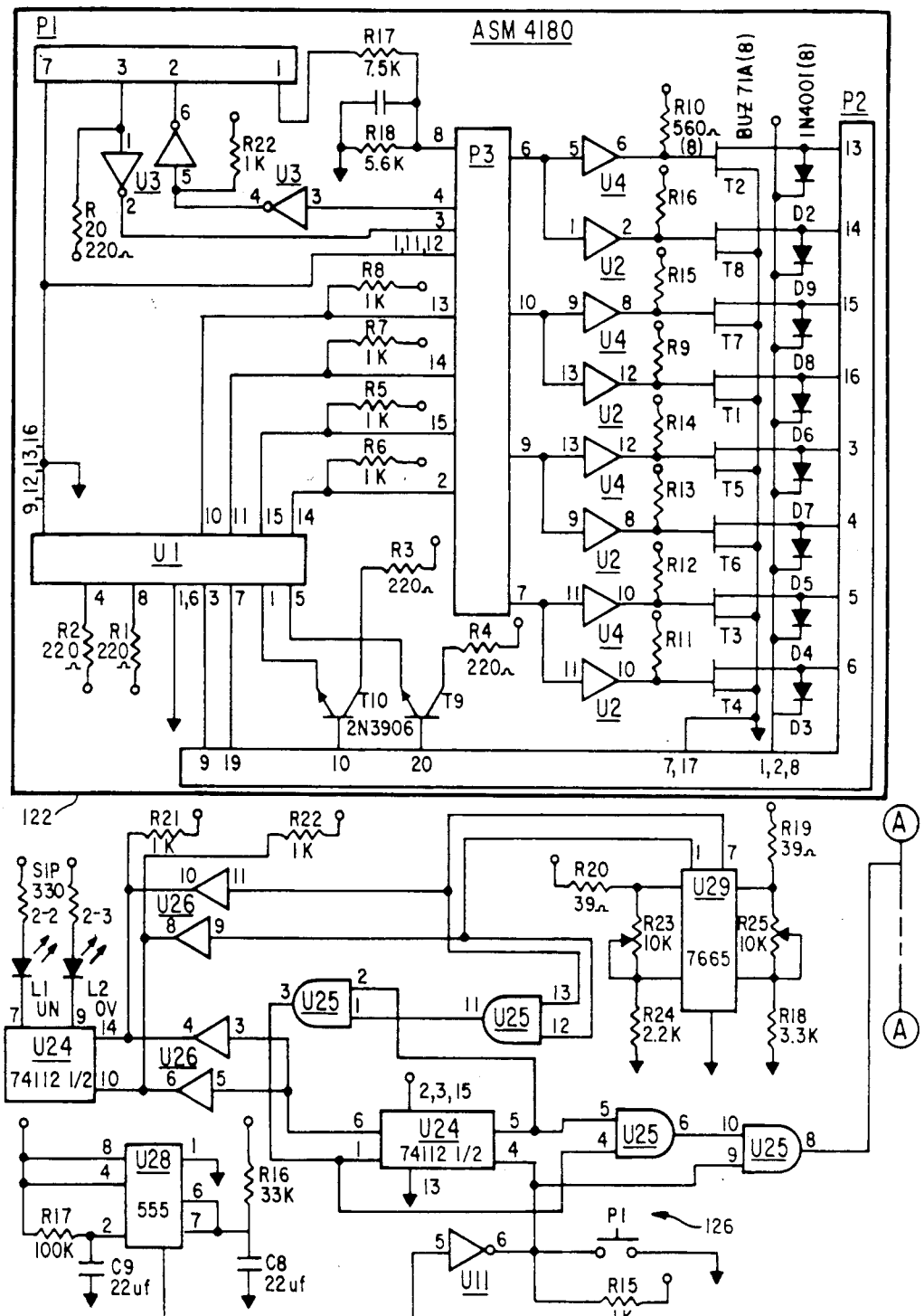
Figure 6B:
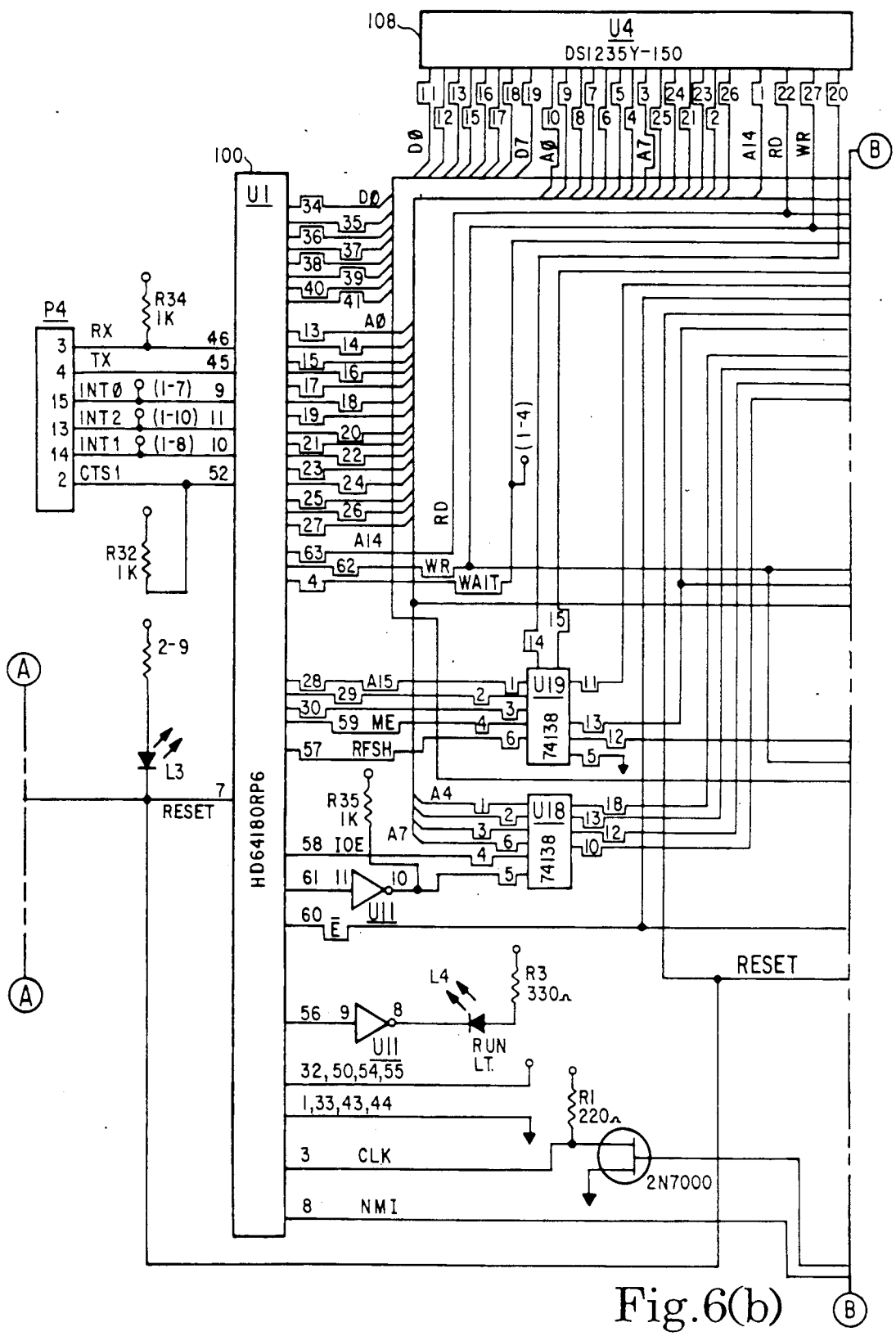
Figure 6C:
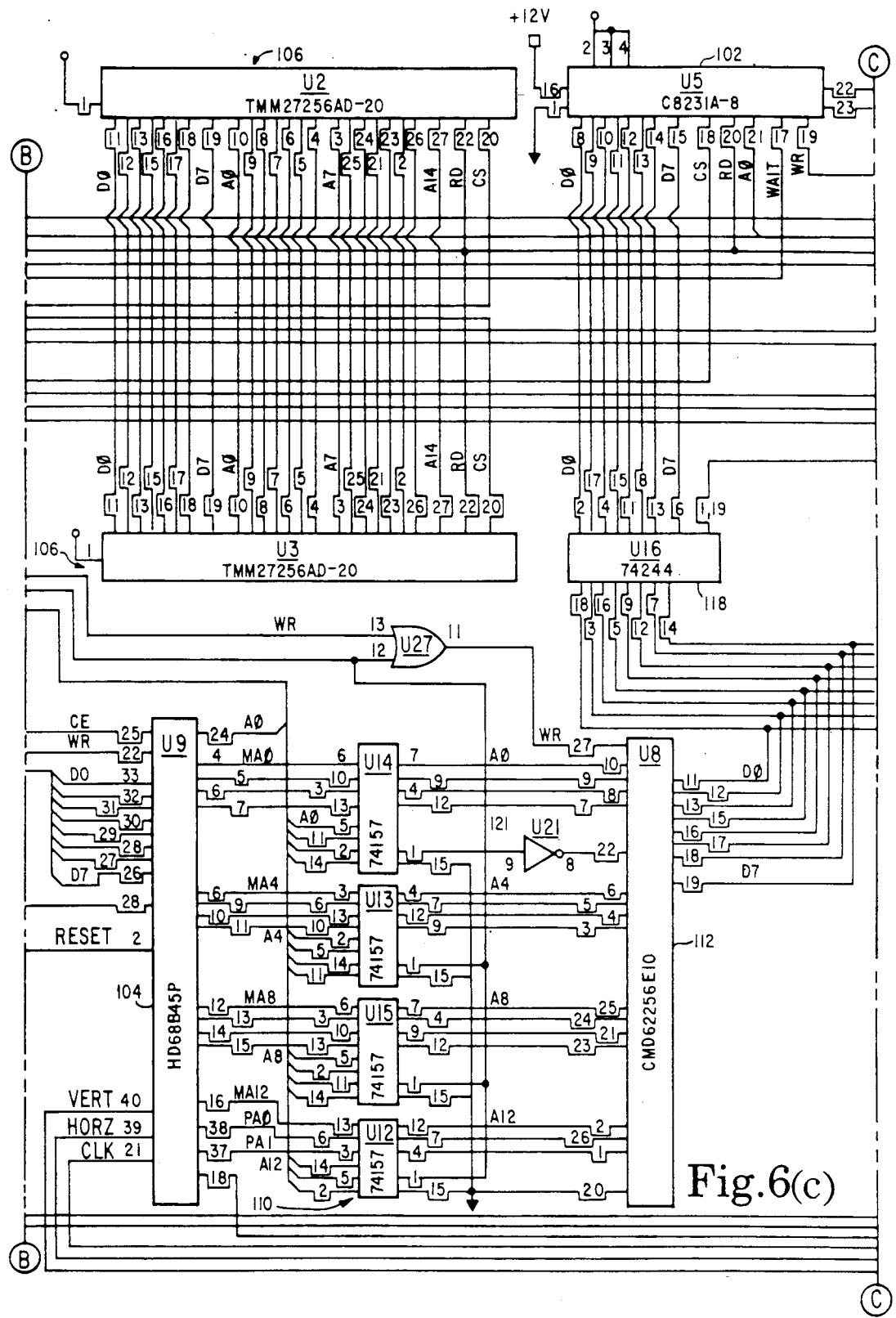
Figure 6D:
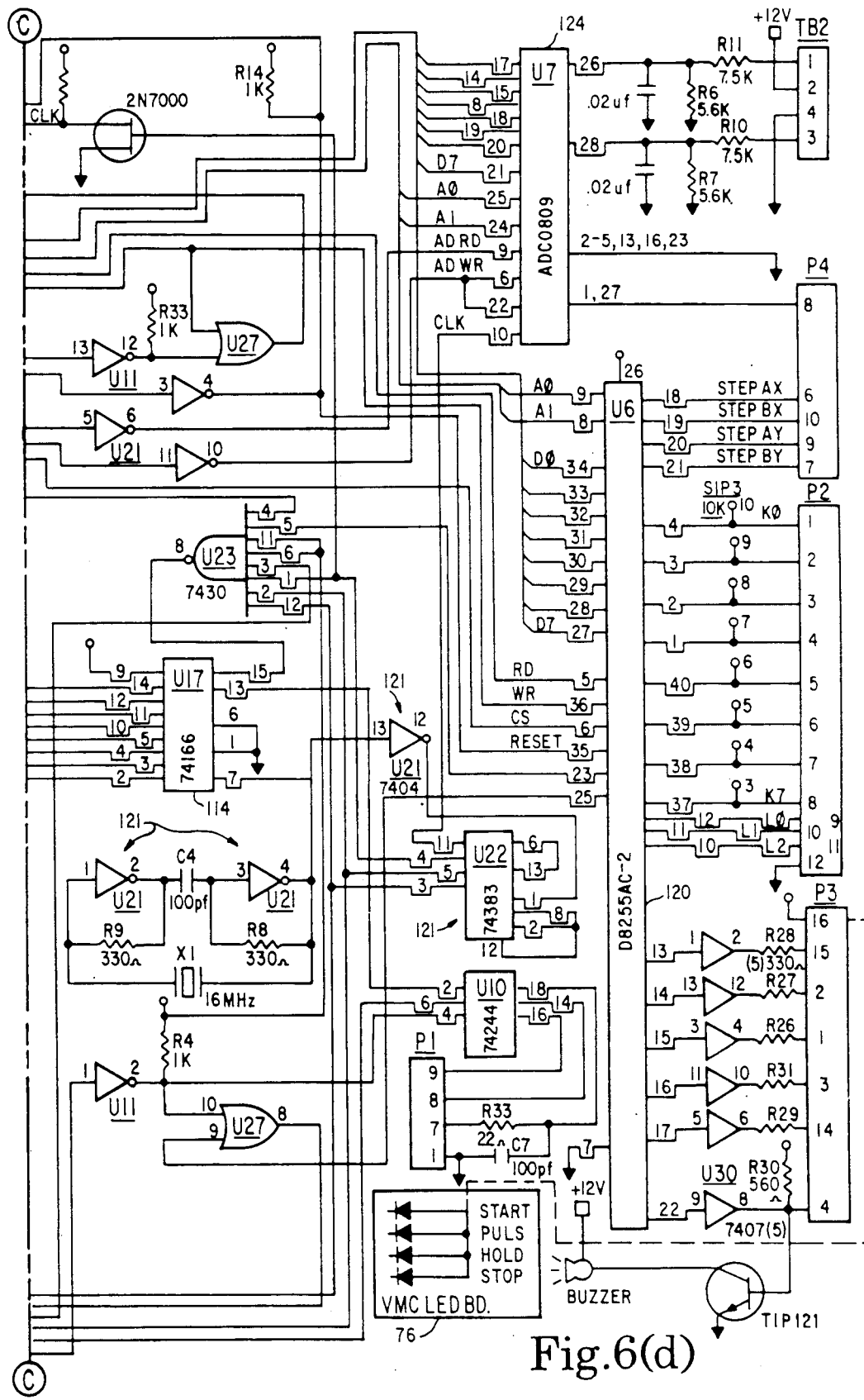

FIG. 4 is a block diagram of the electrical components of the vectoring and orbiting machine control system 30. FIG. 5 is a wiring diagram of the various printed circuit boards forming the unit 30; FIG. 6 is a detailed schematic of the vectoring and orbiting machine control ("VMC") unit 30 controller board, the stepper drive board and LED board. For convenience, the drawings include the circuit board identifying indicia and the chip indicia to enable one of ordinary skill in the art to understand the interconnection of the various circuit elements. Only FIG. 4 need be described in any detail.

With reference to FIG. 4, the vectoring and orbiting machine controller 30 includes a microprocessor 100, a math processor 102 and a video processor 104. Associated therewith, as is understood in the art, are read only memory (EPROM) 106 and random access memory (RAM) 108. Microprocessor 100 is a conventional microprocessor (for example a HD 64180RP6 type microprocessor manufactured by Hitachi). The microprocessor 100 operates on data inputted by the operator in accordance with the program data stored in the EPROM 106.

The math processor 102 contains algorithms that automatically perform arithmetic operations, such as add, subtract, multiply, divide, trigonometric and inverse trigonometric functions, square root, logarithms, exponentiation, and float to fixed and fixed to float conversions. These functions are performed internally to the math processor chip. The microprocessor 100 need only tell the math processor 102 to perform operations on the data. The math processor is preferably a C 8231A-8 type processor manufactured by AMD.

The video processor 104 is a standard video processor chip manufactured by Hitachi. The video processor 104 has associated with it a multiplexer chip 110, a video RAM 112, video output stages 114, and video buffer 116 which, in turn, is connected to the screen 68. The video processor 104 provides the screen 68 with all timing signals. Data is provided to the video processor from the EPROM 106 in order to construct the graphics for the various screens as will be described below. The video RAM 112 stores data inputted by the operator, via the multiplexer circuit 110, in a manner known in the art. Also connected to the data bus is a buffer 118.

The system 30 uses timing chips 120 which provide a 16 MHZ clock signal, which, divided down, is distributed to the various peripheral chips. The microprocessor 100, itself, operates at 8 MHZ.

The manual data interface keyboard interfaces via a programmable peripheral interface 120. The data from the keyboard is multiplexed and inputted to the programmable peripheral interface and bussed with the data bus of the system and the stepper drive translator, or polar translator, 122. The polar translator 122 controls the stepping motors associated with the machine tool head 8 via line 64 and 66. The PPI interface 120 also controls the light emitting diodes 76 associated with the front panel of the control unit 30.

The system further includes an analog to digital converter 124, which has three inputs. Inputs from potentiometers associated with voltage level knob 70 and rate/gain knob 72 are provided to convert the analog input to digital form to be provided over the data bus for reading by the microprocessor 100. Further, the gap voltage signal from the power supply/control unit gap detector/processor 20 is provided as an input via line 62. This signal is converted to digital form to be provided on the data bus and to be read by the microprocessor 100. This gap voltage signal is used by the microprocessor 100 as part of the servo system to control the x and y axis stepping motors, via the PPI digital interface 120 and the stepper drive translator 122, in a manner known in the art, and as described above. That is, the gap detector/processor 20 of the power supply 12 provides an analog voltage output signal which is read by the microprocessor 100 of the control unit 30, via the analog to digital converter 124. Based upon the voltage signal detected, the microprocessor provides servo control of the x and y axis movement. Specifically, the gap detector/processor 20 processes a complex analog waveform reflecting the voltage across the gap into an integrated signal that is representative of the average voltage across the gap, as is well known in the art. This voltage signal is applied, via line 62, to the analog to digital converter 124 which converts the processed analog voltage into digital form and applies such digital data to the data bus for reading by the microprocessor. (This same gap voltage signal is also applied to the system controller 14 within the power supply/control unit 12.) In response to the voltage detected, the microprocessor 100 provides servo control movement of the electrode in the x-y plane. (Similarly, the system controller 14 controls the z-axis translator 16 to effectuate servo control along the z-axis in response to the voltage signal provided from the gap detector/processor 20.) Thus, the microprocessor 100 of the vectoring and orbiting unit 30 acts in conjunction with the system controller 14 of the power supply unit 12 to provide servo control of the gap detector/processor 20 in a manner known in the art.

As discussed above, the microprocessor 100 of the vectoring and orbiting control unit 30 communicates via an RS 232C communications link 60 with the power supply/control system 12. This communications link is a conventional arrangement through which data is exchanged between the microprocessors in accordance with conventional "hand shaking" techniques, well known in the art of digital processing.

The system 30 also includes a reset capability 126 to reset and initialize the various system parameters upon startup.

In operation, input data is entered by the operator of the system through the keyboard, in a manner to be described further below. This manual data input is multiplexed and inputted to the programmable peripheral interface 120 and, in turn, applied to the data bus for reading by the microprocessor 100 in a manner known in the art. The input data is also displayed on the screen 68. The input data is stored in the video RAM 112. The PPI digital interface 120 also controls the operation of the status LED's 76, which are associated with the various switches 74, 78, 80 and 82, as described above.

The operator of the system also sets the cutting voltage level and the servo gain via knobs 70, 72 to set the gap cutting voltage and gain respectively. This analog input is provided to the analog to digital converter 124, which converts the analog information into digital form and applies the digital data to the data bus for reading by the microprocessor 100, in a manner known to those skilled in the art.

As previously mentioned, a read only memory 106 is associated with the microprocessor 100. This memory 106 contains the program necessary for performing various computations and procedures relating to the system. Further, the memory 106 stores all of the video screen graphical data for use by the video processor 104 to construct the screen graphics as will be described below. Also associated with the microprocessor 100 is a random access memory 108, which performs the function of a "scratch pad" memory.

Microprocessor 100 provides various functions for controlling the operation of the unit 30. Microprocessor 100 reads the data inputted by the operator and communicates with the power supply/control system 12 via a conventional RS 232C communications link 60. Specifically, the microprocessor 100 sends command data to the system controller 14 of the power supply/control system 12 indicative of the desired cutting voltage level and gain data and provides command data reflecting the desired movement of the electrode in the z-axis direction. The system controller 14, having received this data, provides the voltage and gain information to the gap detector/processor 20 which provides the cutting voltage across the gap in a conventional manner. Further, the system controller 14 controls the z-axis translator 16 and receives position data from the position detector 18 reflecting the z-axis electrode movement. This z-axis position data is communicated back to the microprocessor of the vectoring and orbiting machine control 30 via the communications link 60. It is thus seen that the actual electrode movement in the z-axis direction is controlled by the system controller 14 based upon command data provided by the microprocessor 100 via the communications link 60. Further, the application of the cutting voltage across the gap is provided by the gap detector/processor 20 under control of its system controller 14 based upon command data provided by the microprocessor 100.

The movement of the electrode in the x-y plane is under direct control of the vectoring and orbiting control unit 30. The microprocessor 100 writes data information over the data bus to the programmable peripheral interface 120, the latter of which stores the data for driving the stepper drive, or polar, translator 122. Translator 122 outputs to the stepping motors via lines 64, 66 to control movement of the electrode in the x-y plane in accordance with instructions from the microprocessor 100.

The microprocessor 100 keeps track of, and counts, the x, y movement of the stepping motors, thus enabling it to know where the electrode is positioned in the x-y plane. This position information is obviously necessary for controlling the desired movement of the electrode, and is also provided, via buffer 118, to the video screen for displaying the instantaneous position of the electrode.

The stepper drive translator, or polar translator, 122 may be the same as that described in U.S. Pat. No. 4,365,300, blocks 20 and 22 thereof. Preferably, power FET's are used as the drive amplifiers for the stepping motors, which reduce the required drive current. The microprocessor 100 thus provides data for controlling the x-axis and y-axis stepping motors in accordance with the desired movement in the x-y plane and also as part of the servo control for the gap detector/processor 20 of the power supply unit.

FIGS. 8(a)-(i) are functional flow charts of the system program. As is known to those of ordinary skill in the art, the program is stored in the read only memory and various program operations are under control of the microprocessor 100. As will be described in detail hereinbelow, the program provides for a user-friendly system by which the operator can call up a menu of various program modes, select a desired mode, and interact with the video display to input desired data values to enable a plurality of orbiting and vectoring operations to take place. These various operations will be discussed hereinbelow.

Figure 7D:
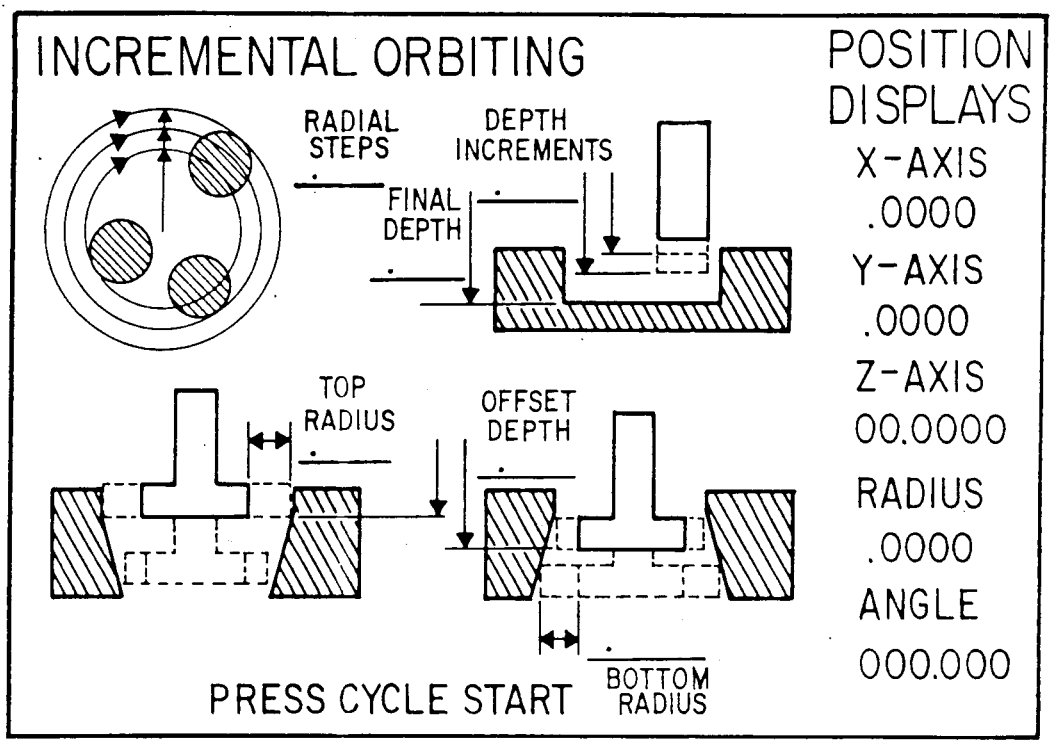
FIG. 7(d) is a video display screen depicting the Incremental Orbiting mode screen.
Figure 7C:
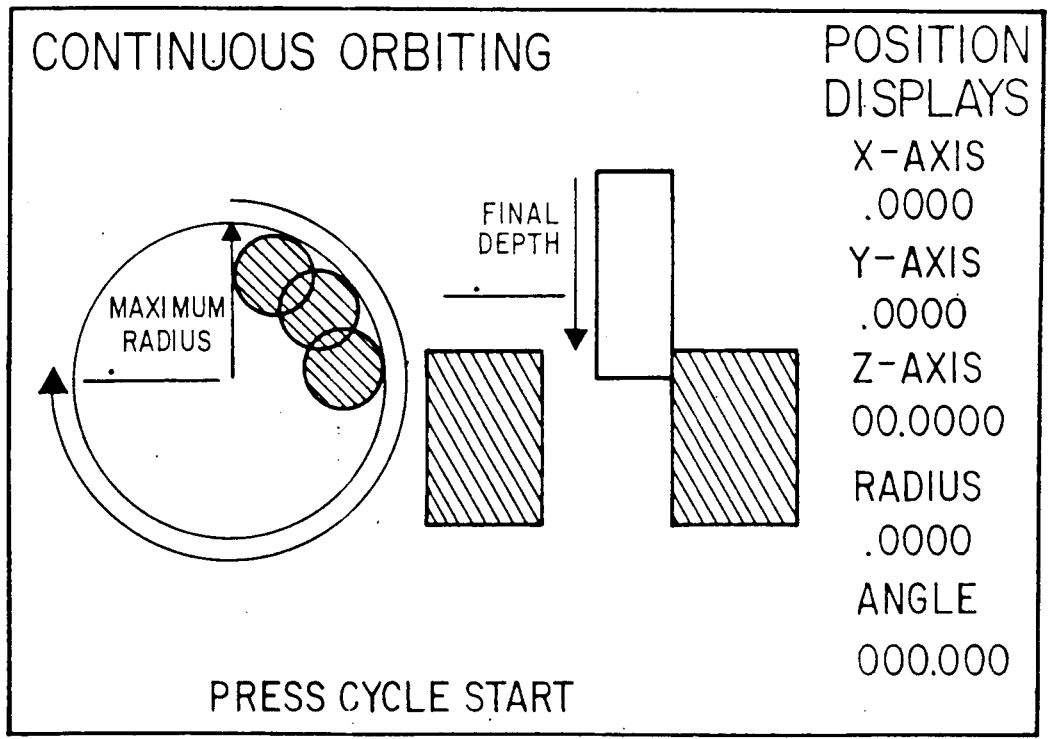
FIG. 7(c) is a video display screen depicting the Continuous Orbiting mode screen.
Figure 7E:
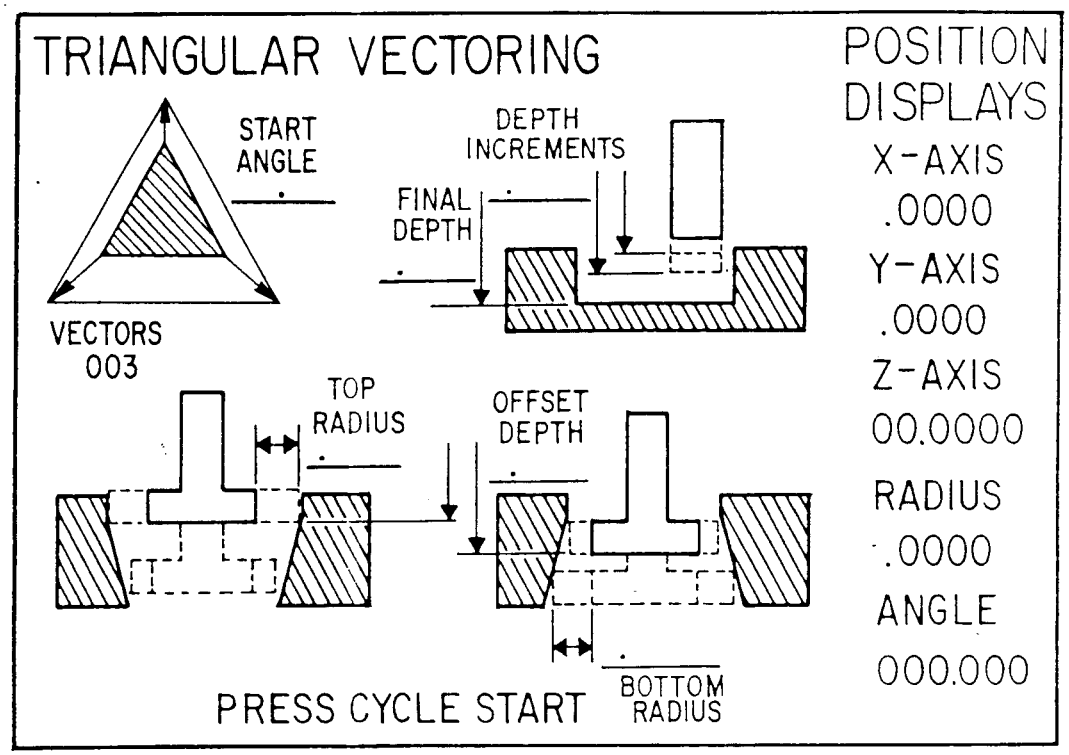
FIG. 7(e) is a video display screen depicting the Triangular Vectoring mode screen.
Figure 7F:
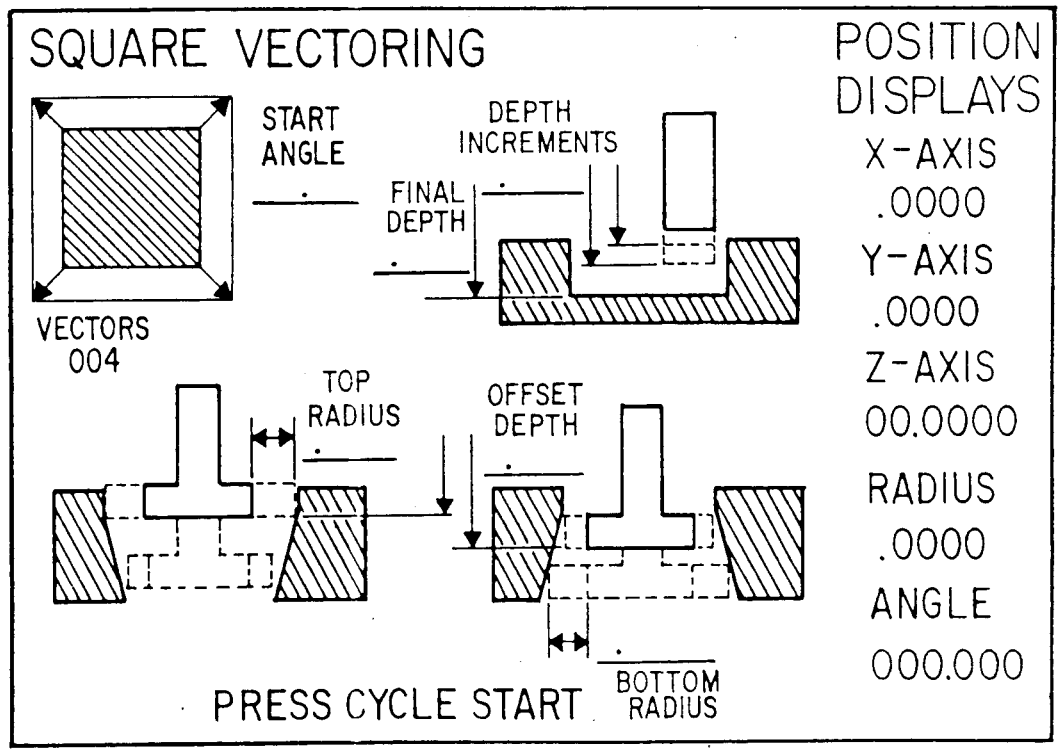
FIG. 7(f) is a video display screen depicting the Square Vectoring mode screen.
Figure 7G:
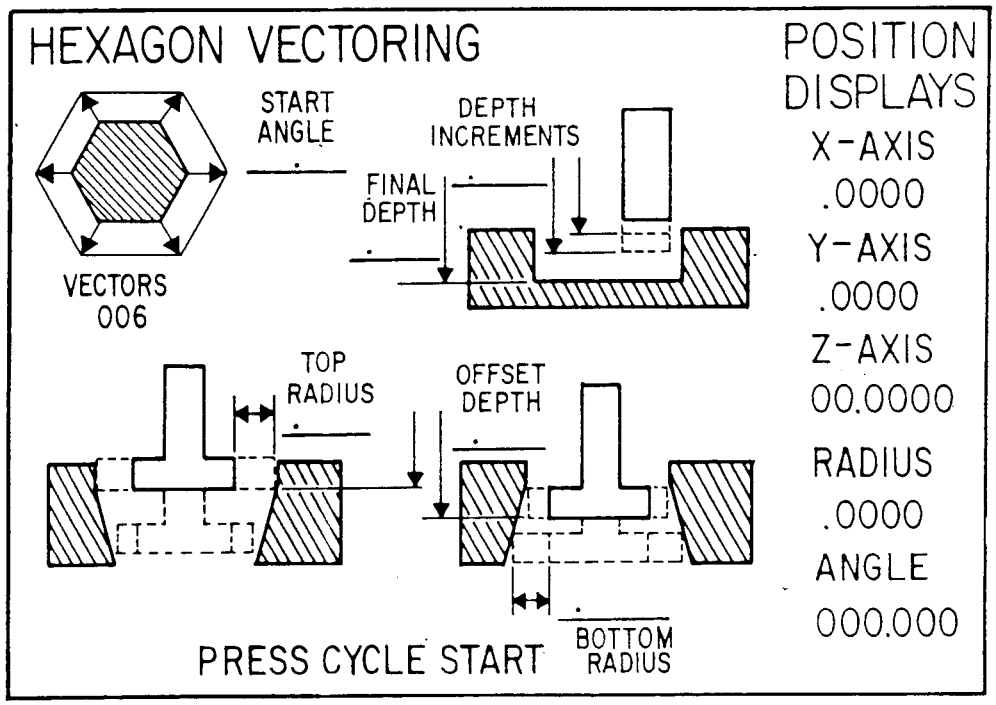
FIG. 7(g) is a video display screen depicting the Hexagon Vectoring mode screen.
Figure 7H:
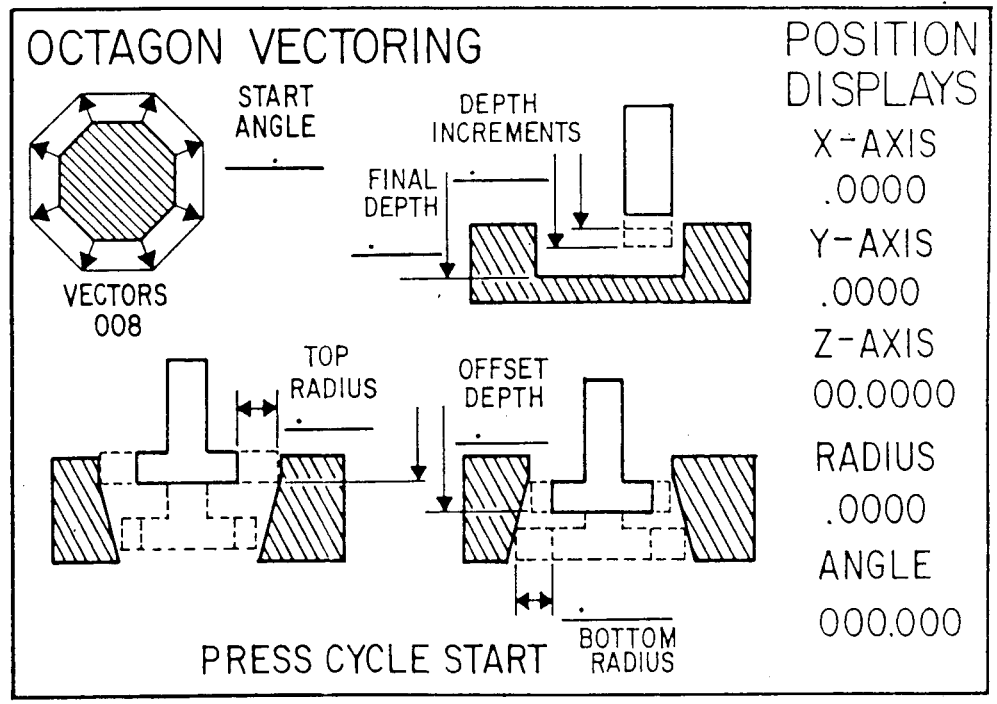
FIG. 7(h) is a video display screen depicting the Octagon Vectoring mode screen.
Figure 7I:
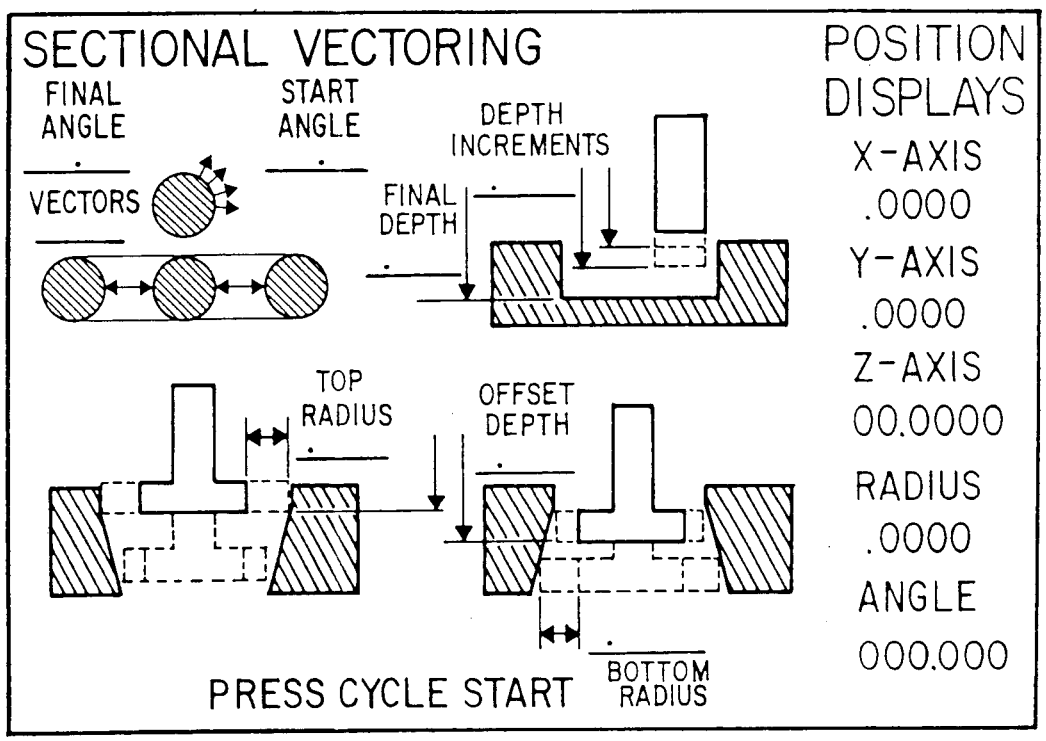
FIG. 7(i) is a video display screen depicting the Sectional Vectoring mode screen.
Figure 8A:
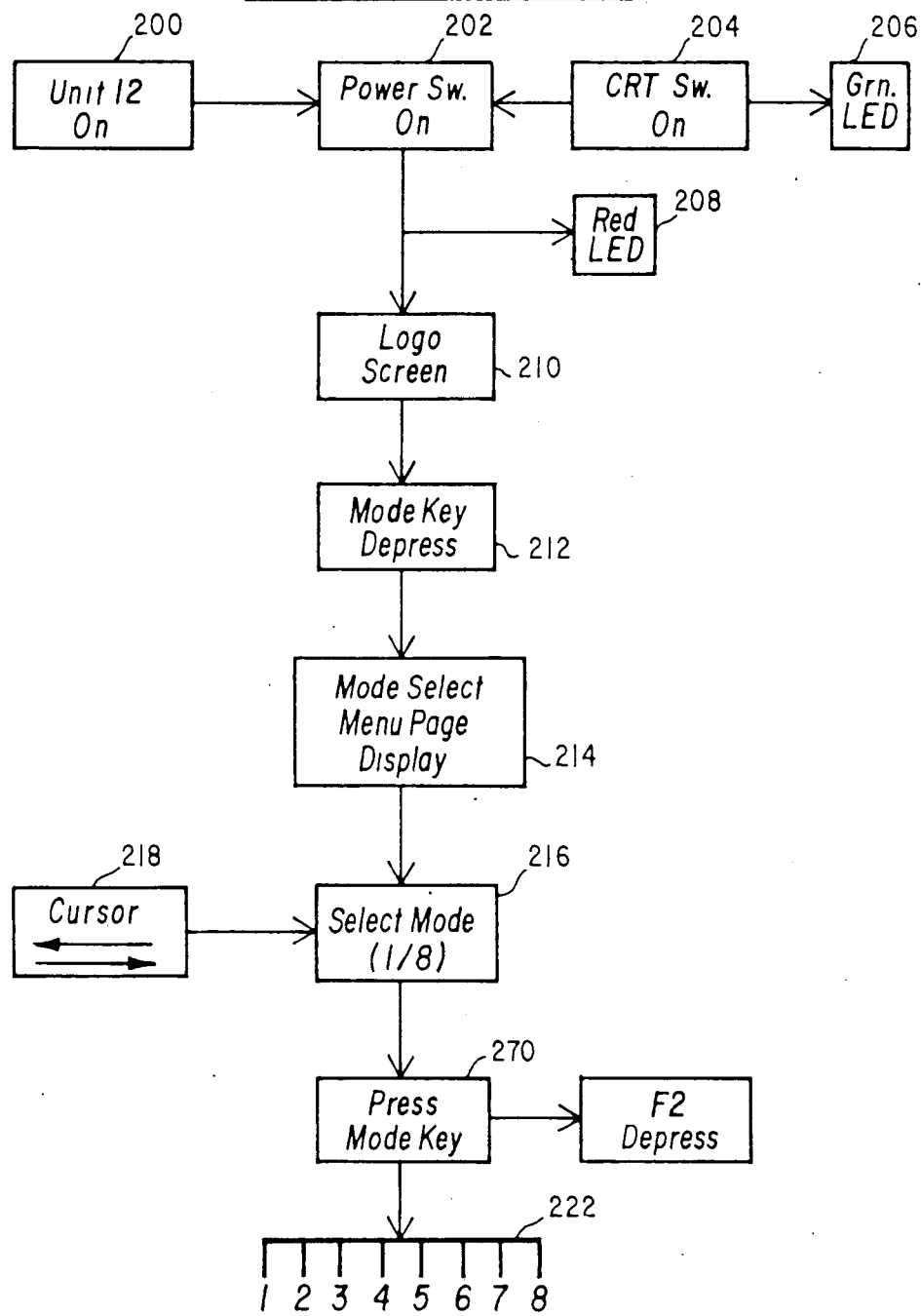
FIG. 8(a) is a flowchart of the initialization program.
Figure 8B:
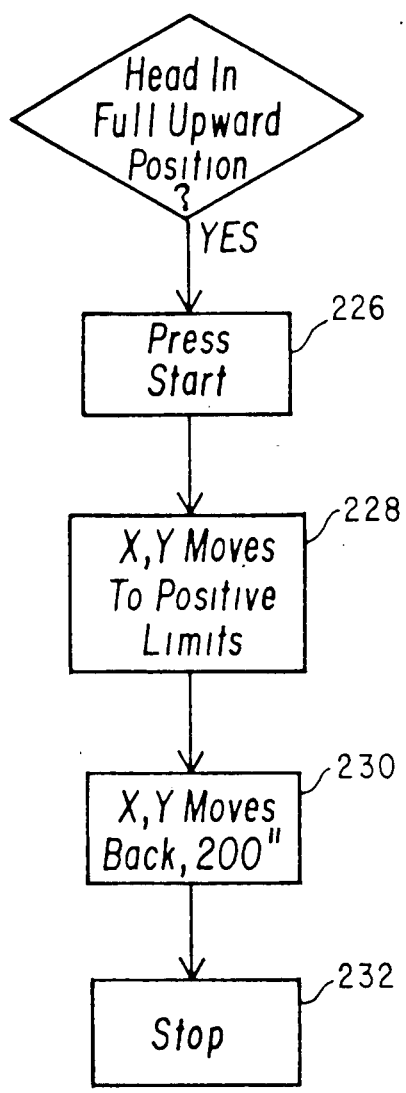
FIG. 8(b) is a flowchart of the Center Zero mode program.
Figure 8C:
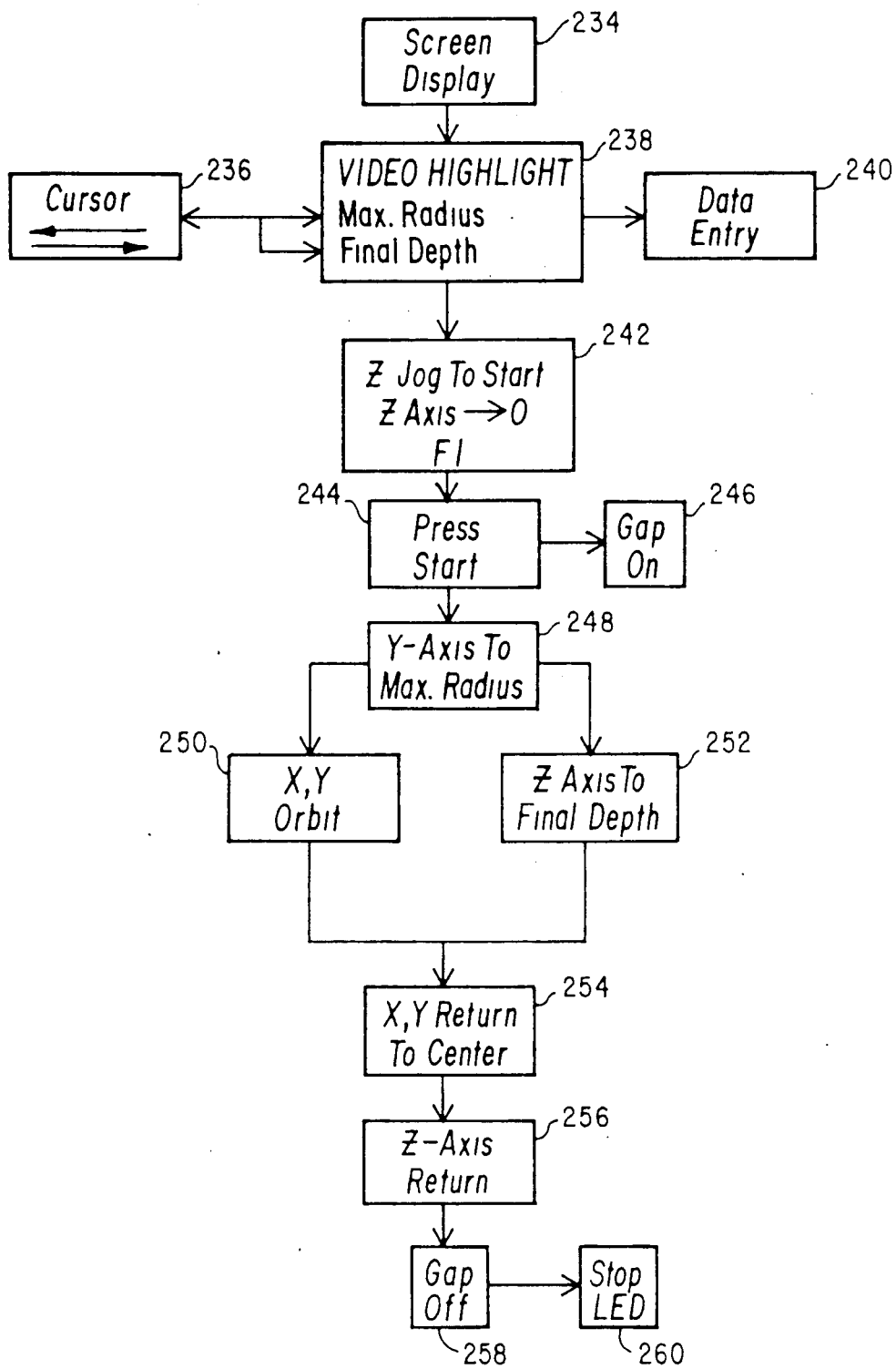
FIG. 8(c) is a flowchart of the Continuous Orbiting mode program.
Figure 8D:
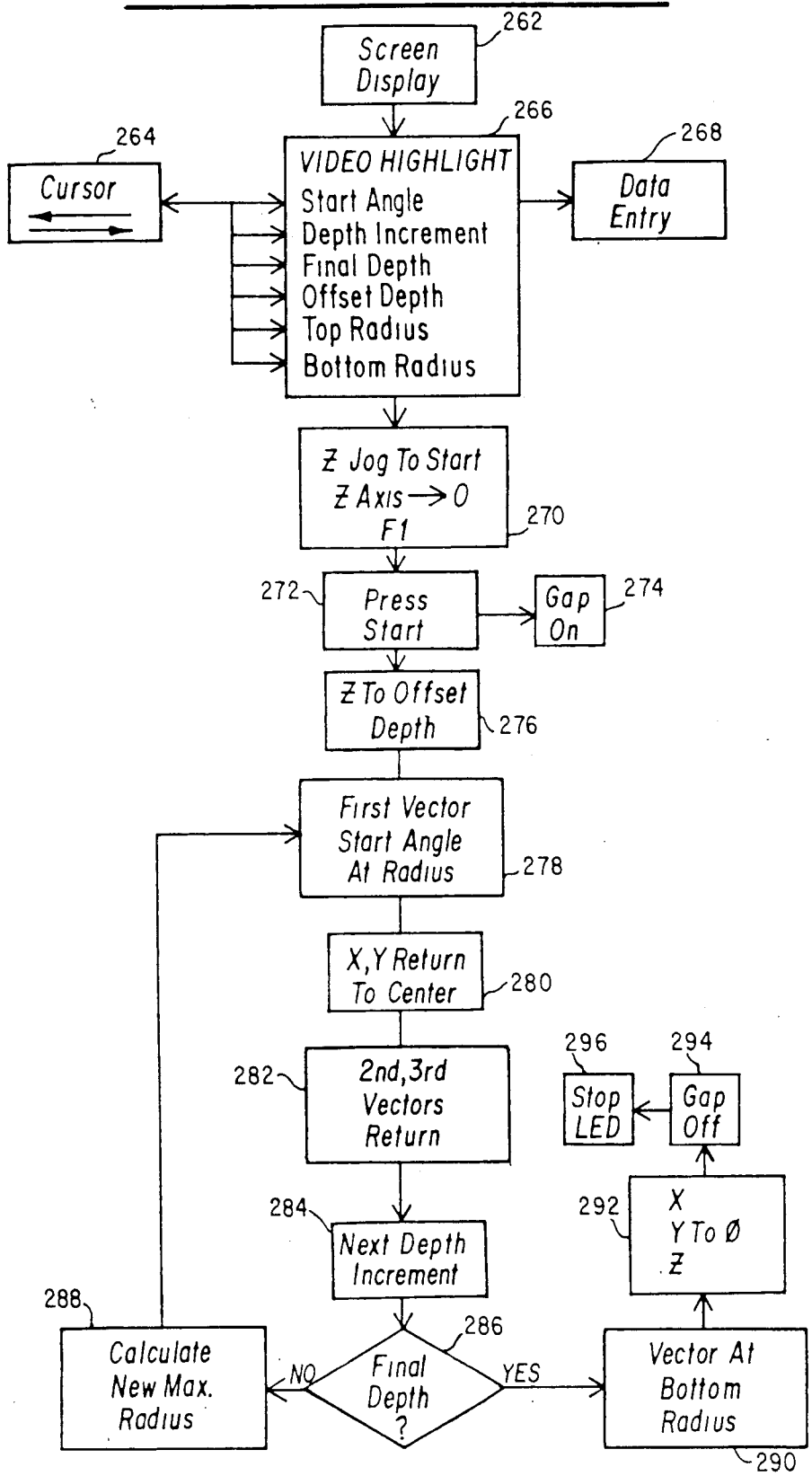
FIG. 8(d) is a flowchart of the Triangular Vectoring mode program.
Figure 8E:
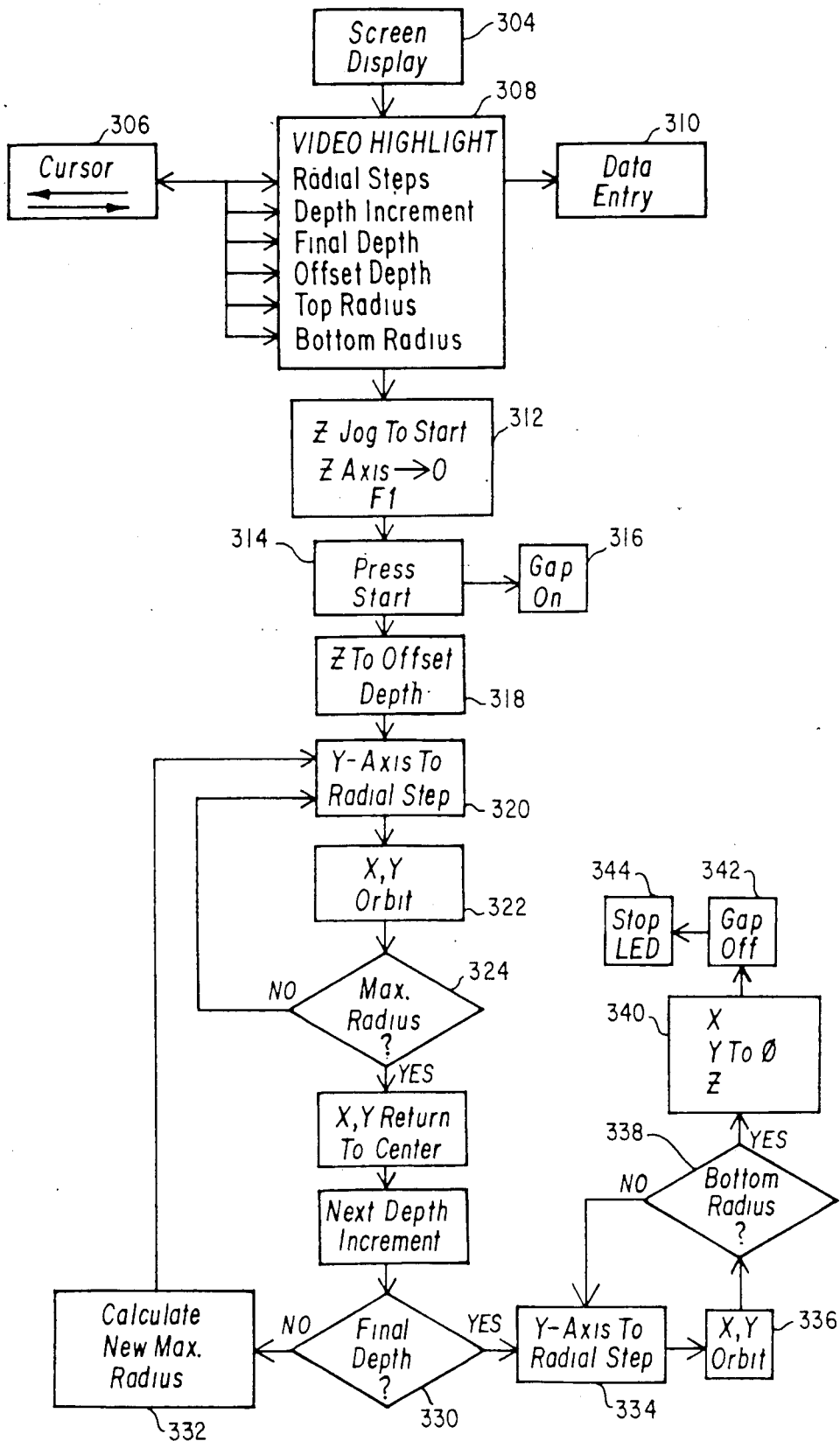
FIG. 8(e) is a flowchart of the Incremental Orbiting mode program.

With reference to FIG. 8(a), the initialization portion of the system is depicted in block diagram form. Initialization begins by the operator turning on the power supply/control unit 12 (block 200), depressing the power switch button 98 (block 202) and depressing the switch 91 to activate the cathode ray tube 68 (block 204). When the switches are activated, the light emitting diode 93, associated with the CRT switch, is activated (block 206) and the light emitting diode associated with the stop key is activated (block 208). The video screen will then display the company logo, including copyright information, etc. (block 210). As discussed above, all of the video screen graphic information is stored in memory and accessed by the video processor 104. The operator may then press the MODE key 96 (block 212) and the MODE selection menu page is displayed (block 214). The mode selection menu page is shown in FIG. 7(a). All of the programmed modes of operation are displayed for the operator's selection. The operator can then select a particular mode that he desires (block 218) by depressing the cursor buttons 86, 88 to move a cursor displayed on the screen in a given direction. Movement of the cursor adjacent a particular screen location serves to highlight (brighten) the various modes. After a particular mode is selected or highlighted (block 216), the operator again presses the mode key 96 (block 220) and one of the particular eight mode screens is displayed on the video (block 222). Each of these eight mode screens is shown as FIGS. 7(b)–7(i) as it appears on the video screen. (The operator may, at this point, press the F2 button located on the panel which serves to convert inputted data to metric form.) Each of the eight modes will now be described.

When the "Center Zero" mode is selected, the video screen displays what is shown in FIG. 7(b). This is the mode used to set the x and y axis slides, and the electrode, to the physical center. In order to accomplish this, it is first necessary that the machine tool head 8 be in its full upward position. Control of the machine tool head 8 in the z-axis direction is accomplished by manually controlling an input to the power supply/control unit 12 in a manner known in the art. When the head is in a full upward position, which thus avoids any collision between the electrode and the workpiece during the centering operation, the operator presses the START button 80 (block 226 of FIG. 8(b)) and the vectoring and orbiting machine polar translator moves the x and y cross slides to their absolute positive limits (block 228). That is, the x-axis and y-axis stepping motors move the cross slides, with the electrode attached thereto, to the maximum possible limits in the x and y directions respectively. Then, the microprocessor controls the polar translator to move the x and y cross slides a predetermined distance back in the x and y direction (block 230). In a preferred embodiment, it has been found that the maximum x and y limits should be 0.200 inch to accommodate typical EDM machine operations. This value is by way of example only and obviously other limit values can be selected. The system is now initialized and the STOP light emitting diode 82 is turned on (block 232) and the operator then may select another mode of operation. The operator depresses the MODE key and the mode selection menu page is displayed, FIG. 7(a).

When the "Continuous Orbiting" mode is selected, the video screen displays what is shown in FIG. 7(c). See block 234, FIG. 8(c). The continuous orbiting mode is used to perform a circular orbiting type operation. The electrode continuously orbits in the x-y plane as the electrode moves in the z-axis, thus machining the cavity larger than the electrode. After the screen is displayed (block 234), the operator moves the cursor (block 236) to highlight the two inputs that are needed for this mode (block 238). These inputs are the "Maximum Radius" and the "Final Depth" values. The operator may first highlight the Maximum Radius input and then enter data through the key pad (block 240) reflecting the desired size of the maximum radius. The video screen displays the maximum radius value that the operator selects. The operator then enters the Final Depth data, which is again displayed on the screen for checking by the operator to determine that the data entries are valid. The data is entered via the numerical keys to the front panel (block 240).

Before the machining operation is to be started, it is necessary to zero out the electrode in the z-axis. This is represented in block 242. The electrode is jogged, or moved, along the z-axis (manually, using the power supply/control unit 12) to the desired start position. This position is preferably the position where the electrode is touching the top of the workpiece during depth finding. When this point is reached, the F1 button on the control panel (button 94) is depressed, which sets the z-axis value at zero. Once the z-axis is zeroed, the operator presses the start button 80 (block 244) and the EDM machining operation begins. That is, the gap cutting voltage is applied across the electrode and workpiece (block 246) in a manner as described above.

In the continuous orbiting mode, when the START key is depressed, the electrode first moves outward in the y-axis direction to the maximum radius value a set by the operator (block 248). Then, the electrode begins to orbit in the x-y plane at that radius value in a circular pattern (block 250) and this orbiting continues while, at the same time, the z-axis machines to the final depth value that was inputted by the operator (block 252). When the x and y orbiting and the z-axis movement are completed, the x and y slides are returned to the center position (block 254), the electrode is retracted in the z-axis direction (block 256) and the power supply voltage is turned off (block 258). The light emitting diode adjacent to the STOP button 82 is then activated (block 260).

When the Triangular Vectoring mode is selected by the operator the video screen displays what is shown in FIG. 7(e). See block 262, FIG. 8(d). Triangular vectoring is a function that is used to perform a canned cycle type vectoring operation for an equilateral triangle. Generally, it operates by first machining down to a depth specified by the "offset depth" for the z-axis. Once this depth is reached, the x and/or y axis motors begin to vector out at the specified "start angle", and then at the next two angles. Vectoring is performed for a complete 360° in three increments.

In order to input the data, the operator moves the cursor (block 264) to highlight on the video screen the start angle, depth increment, final depth, offset depth, top radius, and bottom radius values (block 266). Using the numerical key pad, the various data is entered (block 268). The "start angle" is the entry used to designate the start angle for vectoring. The y positive axis is deemed 0° and increasing angle rotation is clockwise. The "top radius" value is used to designate the amount of metal to be removed across the flats at the top of the cavity. Depending on the type of taper, this entry can be either larger or smaller than the bottom radius. The "bottom radius" entry is used to designate the amount of metal to be removed across the flats at the bottom of the cavity. The "offset depth" entry is used to designate the offset depth for the z-axis. The "final depth" value designates the depth at the bottom of the cut. The "depth increment" entry is used to designate the size of the depth increments along the z-axis direction. That is, after the offset depth is reached, further movement to the final depth occurs along increments as set by the operator. It is not necessary that this incremental value be an exact division of the final depth minus the offset depth. The last increment will never exceed the final depth value that the operator inputs.

After the data is entered, the operator then zeros out the z-axis (block 270) in a manner as described above. The start button is then pressed (block 272) and the gap voltage is activated (block 274). The electrode then moves in a z-axis direction to the offset depth value as input by the operator (block 276). Then, the electrode is moved along the start angle a distance equal to the top radius input value (block 278). After the machining is completed at this first vector start angle, the x and y axis are returned to center (block 280) and the second vector is machined at the second vector angle which, is 120° relative to the start angle (block 282). Again, the vectoring takes place to the top radius value, is returned to center and then the third vector machining is performed 120° from the second vector (block 282). After the three equilateral vectors are machined at the top radius value, and the electrode is returned to center, the electrode machines downwardly in accordance with the depth increment value inputted by the operator (block 284). The system then checks if this is the final depth (block 286). If it is not, then a new radius value is calculated (block 288), in a manner to be described below, and the first, second and third vectors are machined at this new radius value in the same manner as described above. After the three vectors are machined at a given depth, the system increments to the next depth and continues this process until the final depth is reached (block 286) at which time vectoring takes place at the bottom radius value that was inputted by the operator (block 290). After vectoring occurs at the bottom, the x, y and z slides are returned to their center and zero position respectively (block 292), the gap voltage is turned off (block 294) and the "stop" light emitting diode is turned on (block 296).

Calculation of the "new radius" i.e., the various radial values at each of the incremental depth levels, may be understood by referring to FIG. 8(i). In order to calculate the various radius values, the system first calculates the number of "z steps" that machining will take place from the offset depth to the final depth. This is determined by subtracting the offset depth from the final depth and dividing that value by the depth increment value that the operator had inputted (block 298). The system then calculates the "taper" value, which is the incremental radial value at each of the depth increments. As is apparent, this is calculated by subtracting the bottom radius from the top radius and dividing that difference by the "z step" value (block 300). The new radius is then calculated (block 302) by adding or subtracting the taper value to the last radius value that was calculated. The taper value will be added or subtracted depending upon whether the taper is in an increasing or decreasing direction, which is determined by whether the bottom radius is less than or greater than the top radius. These relatively simple calculations are done by the microprocessor in conjunction with the math processor in a manner known to those skilled in the art. It is thus apparent that, as a result of such calculation, as the electrode is machined down the various incremental depth stages, the radial machining value at each incremental depth stage is altered to provide a smooth tapering transition from the offset depth to the final depth.

The "Square Vectoring", "Hexagon Vectoring", and "Octagon Vectoring" modes operate in a manner similar to the Triangular Vectoring mode described above. The display screen for each of these modes is depicted in FIGS. 7(f), 7(g) and 7(h), respectively. The difference between these various modes is only the number of vectoring angles that take place relative to the start angle. That is, whereas the Triangular Vectoring mode had three vectors spaced 120° apart from each other at each depth increment, the Square Vectoring mode includes four vectors spaced at 90° apart, the Hexagon Vectoring includes six vectors spaced 60° apart and the Octagon Vectoring includes eight vectors spaced 45° apart. Otherwise, their operation is identical to the Triangular Vectoring mode and will not be repeated.

The "Incremental Orbiting" mode, when selected by the operator, displays that which is depicted in FIG. 7(d). See block 304, FIG. 8(e). The Incremental Orbiting mode operates by first machining down to a depth specified by the offset depth for the z-axis. Once this depth is reached, the x and y axis begin to orbit in a circular pattern. The maximum radius of the orbits is set by the "top radius" and the "bottom radius" values. Orbiting to the maximum radius at each incremental depth is reached in radial steps, as will be described hereinbelow.

In this mode, the operator moves the cursor (block 306) to highlight the various input values that are required (block 308). Specifically, the operator must enter the offset depth, final depth, top radius, bottom radius, and depth increment values as discussed above. Further, the operator must input the values for the radial steps. When the radial step value is smaller than the maximum radius, the maximum radius will be reached in incremental radial steps.

After these data values are entered (block 310), and the z-axis is zeroed out (block 312), the START button is depressed (block 314) and the gap cutting voltage is activated (block 316). The electrode then is machined down to the offset depth value as discussed above (block 318).

Once the offset depth is reached, machining then takes place by moving the electrode along the y-axis to the radial step value inputted by the operator (block 320). At this radial step, the electrode begins to orbit by activating the x and y stepping motors respectively (block 322). Orbiting continues until a full circle is reached and the system then checks to see if the electrode is at the maximum radius for that particular depth increment (block 324). Initially, the maximum radius will be the top radius. If the maximum radius has not been reached, the y-axis is again moved out a radial step value (or the maximum radius value if less than a radial step increment away) (block 320) and orbiting then takes place at this new radius value (block 322). This is repeated until the maximum radius is reached and the electrode is then returned to center (block 326). Machining then takes place along the z-axis to the next depth increment (block 328), where the system checks if this is the final depth (block 330). If it is not, then a new radius is calculated at this depth value in a manner as previously described with reference to FIG. 8(i). See, block 332. Once the new radius value is calculated, the process is repeated and orbiting takes place at the various radial step values until the maximum radius is reached for that particular depth. The electrode is then machined to the next depth increment and this process repeats until the final depth is reached. When the final depth is reached, the electrode is machined in a y-axis direction to the radial step value (block 334), orbiting takes place at this radial step value (block 336), the system determines if the maximum or bottom radius is reached (block 338) and if not, the process repeats itself until the bottom radius value is reached as shown in block 338. At this point, the x, y and z slides are returned to center and zeroed respectively (block 340), the gap voltage is turned off (block 342) and the stop light emitting diode (block 344) is lit.

Figure 8F:
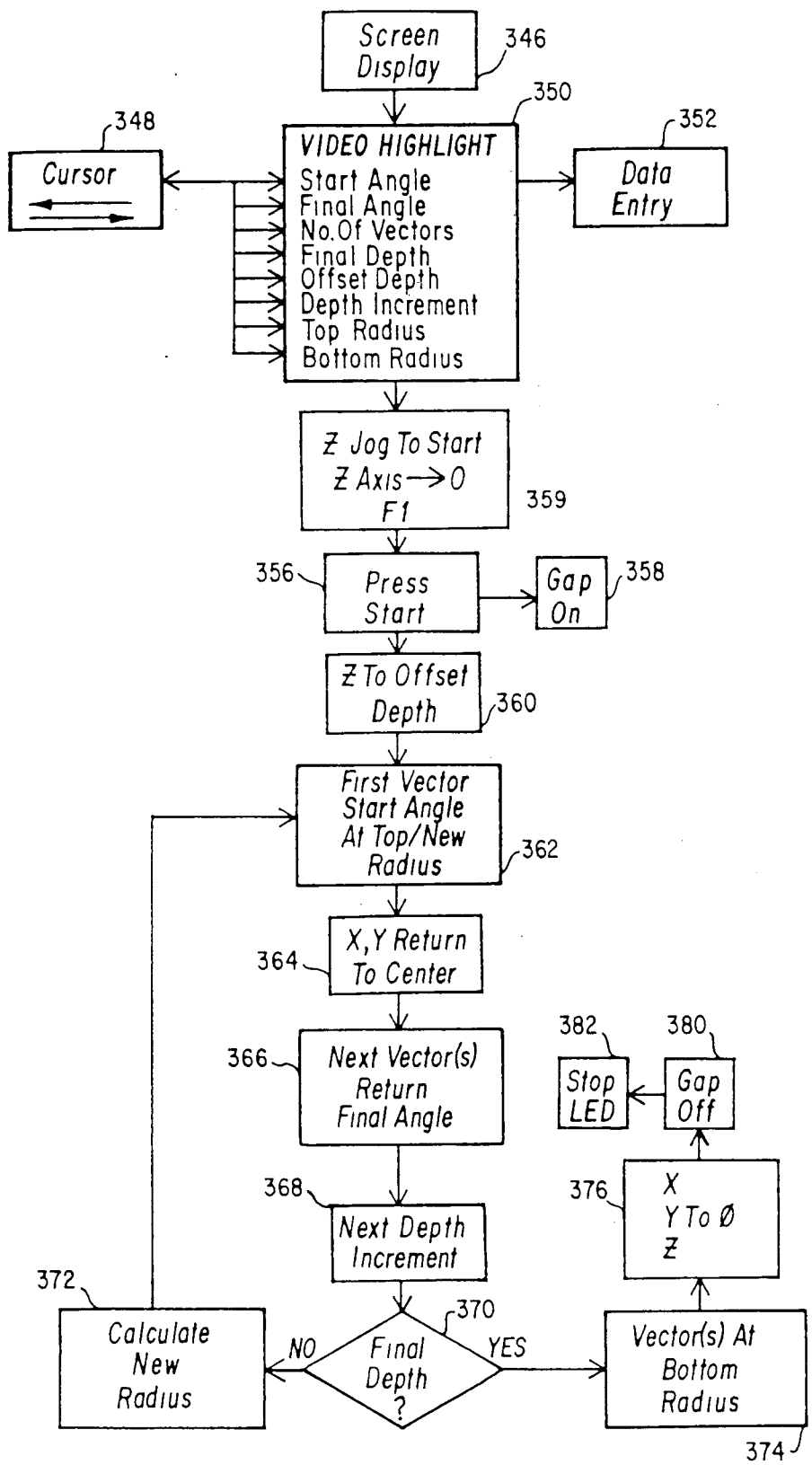
FIG. 8(f) is a flowchart of the Sectional Vectoring mode program.
Figure 8G:
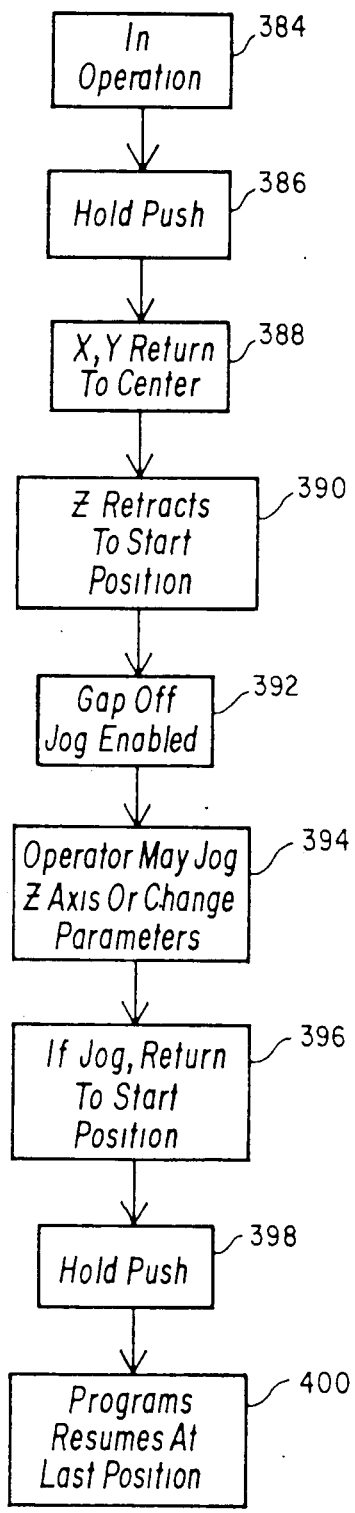
FIG. 8(g) is a flowchart of the Hold mode program.

The next vectoring mode is the "Sectional Vectoring" mode as shown in FIG. 8(f). When this mode is selected, the screen displays that which is shown in FIG. 7(i) (block 346). This mode differs from the above-described canned vectoring modes in that the operator can select the start angle, the final vectoring angle, and the number of vectors that take place in between the start angle and the final angle. For example, the operator may select the start angle at 90°, the final angle at 270°, and select that three vectors are to be machined. With such an arrangement, the first vector will be at 90°, the second vector would be at 180° and the third vector would be at the final angle of 270°. The formula for calculating the intermediate vector angles is the (final angle minus the start angle) divided by the (number of vector minus one).

Sectional vectoring requires operator input by movement of the cursor (block 348) to highlight the various data input values required (block 350). These input values include, as with the other modes discussed above, the final depth, the offset depth, the depth increment, the top radius, and the bottom radius. In addition, the start angle, final angle and number of vectors desired must be entered (block 352). Once the data is entered, and the z-axis is zeroed (block 354), the start button is depressed (block 356) and the gap cutting voltage begins (block 358). The electrode is first machined in a z-axis direction to the offset depth (block 360). Once the offset depth is reached, machining takes place along the start angle at the top radius value (block 362). Once this radial value is reached, the electrode is returned to center (block 364) and the next vector is machined to the top radius value (block 366). The vectoring takes place depending upon the number of vectors selected, and when the vectoring is completed at a given depth, machining takes place in a z-axis direction to the next depth increment (block 368). If the final depth has not been reached (block 370) a new radius value is calculated, as discussed above, and vectoring is repeated at this new depth increment to the new radius values. This process is repeated, similar to the previously discussed modes, until the final depth is reached, in which case vectoring takes place at the bottom radius value (block 374) and, when completed, the x, y and z axes are returned to center and zero respectively (block 376). The gap voltage is then turned off (block 380) and the stop light emitting diode is activated (block 382).

During the various machining modes, discussed above, the instantaneous x-axis, y-axis, z-axis, radius, and angle values are displayed in real time on the display screen. These values are displayed on the right side of the screens, as shown in FIG. 7(b)-(i).

If, during the course of a machining operation, the operator desires to "hold" or interrupt the system, he may do so by depressing the HOLD key 78. For example, with reference to FIG. 8(g), when the system is in operation (block 384), the operator may push the HOLD key (block 386) which returns the electrode in the x, y plane to center (block 388) and the electrode is then retracted along the z-axis direction to its start, or zeroed, position (block 390). The gap cutting voltage is turned off by the power supply/control unit 12 and a "jog" function is enabled on the power supply 12, a conventional feature of such power supply/control units, such as the EP 300 CP. See, block 392. At this point, the operator may desire to change any of the system parameters, i.e., the input values, or may desire to move or jog the electrode along the z-axis, perhaps to check the gap. If the operator does move the electrode along the z-axis, it must be returned to its start or zero position (block 396) and then the HOLD button is again pushed by the operator (block 398). The system then resumes operation at the point at which it was interrupted (block 400).

The operator may also desire to stop or shut down the system during operation. Reference should be made to FIG. 8(h). When the system is in operation (block 402) and the stop button is pushed (block 404) the electrode automatically returns to center (block 406) and moves along the z-axis to its start position (block 408). The gap is then automatically turned off and the "jog" is enabled, as previously discussed (block 410), and the control of the unit now reverts to the power supply/control unit 12 (block 412). Restarting occurs by depressing the START button 80, and machining will start from the beginning.

While preferred forms and arrangements have been shown in illustrating the invention, it is to be clearly understood that various changes in detailed arrangements may be made without departing from the spirit and scope of the invention.

What is claimed is:

1. A vectoring and orbiting control unit for an electrical discharge machine (EDM) system, the EDM system including (a) an electrode/workpiece support system for mechanically supporting and moving an electrode with respect to a workpiece in z-, x-, and y- axes, and (b) an electrical power supply/control system for providing electrical machining power to, and controlling the movement of, the electrode/workpiece support system, the electrical power supply/control system including a gap voltage detector/processor for detecting a voltage across the gap formed by the electrode and workpiece and producing a gap condition signal indicative thereof, a position detector for detecting the position of the electrode with respect to the workpiece, a z-axis translator for moving the electrode and workpiece relative to each other in a z-axis direction, and a system controller for controlling the gap voltage and z-axis translator in accordance with the gap condition signal, wherein the vectoring and orbiting control unit comprises:

video display means for displaying (a) a graphics menu of vectoring/orbiting machining modes, (b) selected input data values, and (c) data values representative of the position of the electrode;

manual input means for selecting a particular vectoring/orbiting mode from the menu of predetermined vectoring/orbiting modes and for selecting input values in response to prompts including graphical illustration of said particular vectoring-/orbiting mode, said prompts appearing on said display means in response to selection of a particular vectoring/orbiting mode;

translating means connected with the electrode/-workpiece support system for controlling the movement of the electrode with respect to the workpiece in an x-axis and y-axis direction;

communication linking means connected with the electrical power supply/control system for providing command data to the system controller; and processing means for processing and converting data from the manual input means and for providing x-axis and y-axis control data to said translating means and for providing z-axis command data to said communication linking means, whereby the translating means controls the movement of the electrode with respect to the workpiece along the x-axis and y-axis and the electrical power supply/-control system controls the movement of the electrode with respect to the workpiece along the z-axis in accordance with the z-axis command data.

2. The vectoring and orbiting control unit of claim 1 wherein said video display means comprises a cathode ray tube.

3. The vectoring and orbiting control unit of claim 1 wherein said processing means receives position data over said communication linking means from said electrical power supply/control system and, in response thereto, provides the x-axis and y-axis control data to said translating means, and position data to said video display means.

4. The vectoring and orbiting control unit of claim 1 further comprising gap voltage detecting means connected with the gap voltage detector/processor of said electrical power supply/control system, said gap voltage detecting means for receiving gap voltage signals, said gap voltage signals provided to said processing means.

5. The vectoring and orbiting control unit of claim 4 wherein said processing means receives z-axis position data over said communications linking means from said electrical power supply/control system, determines x-y positioning of the electrodes, and, in response to the gap voltage signals and the x, y, z position data, provides the x-axis and y-axis control data to said translating means, to control x-axis and y-axis movement of the electrode, and provides z-axis command data to said system controller.

6. A vectoring and orbiting control unit for an electrical discharge machine (EDM) system, said unit comprising:

manual input means for selecting a particular vectoring/orbiting mode from a menu of predetermined vectoring/orbiting modes and for inputting positional values for the particular mode selected in response to prompts including graphical illustrations of said particular vectoring/orbiting mode;

storage means for storing a plurality of vectoring/orbiting modes;

control means for controlling electrode movement of an EDM machine in accordance with control data provided by a processing means;

display means for displaying the menu of vectoring-/orbiting modes and the inputted positional values; and processing means for receiving input data from the manual input means, and mode data from said storage means, and for providing display data to said display means and control data to said control means, wherein said processing means provides for display of a menu of predetermined vectoring and orbiting modes on said display means, selection by an operator of a particular one of said modes through the manual input means, display of the particular mode selected wherein the display of the mode includes graphical prompts depicting the mode selected and graphically illustrating to the user the relationship between requested positional values and resulting electrode movement based upon inputted positional values, selection by the operator of positional values for the selected mode, display of the selected position values, and for providing control data in accordance with the selected mode and positional values.

7. The vectoring and orbiting control unit of claim 6 wherein the plurality of predetermined vectoring/orbiting modes stored in said storage means includes an orbiting mode and a geometric vectoring mode, the positional values required for the orbiting mode including radius values and depth values, the positional values required for the geometric vectoring mode including the start angle, radius values, and depth values.

8. The vectoring and orbiting control unit of claim 7 wherein the positional values required for the geometric vectoring mode include the initial electrode depth in the z-axis direction (the "offset depth"), the final depth, and the depth increments from the offset depth to the final depth, the starting angle at which the electrode is to move in the x-y plane, and the radii at which the electrode is to move at the offset depth and final depth.

9. A vectoring and orbiting EDM machine comprising:

an electrode;

means for causing relative movement between said electrode in x-axis, y-axis and z-axis directions and a workpiece to be machined, said means for causing relative movement including a movement input, and means for positioning said electrode in accordance with signals supplied at said movement input;

power supply means connected to said electrode for supplying a cutting voltage to said electrode;

display means having a display input for signals and having a display medium for graphically displaying graphics images and alphanumerical values response to signals receiving at the display input;

keyboard means for entering data values and control signals; and processing means coupled to the movement input and to the display input and to the keyboard means for inputting data values and control signal from said keyboard means and supplying movement signals to said movement input, said processing means including:

(1) means connected to said display input for causing the display means to graphically displaying a plurality of images including a graphical EDM machining menu screen and graphically indicate a menu selection from said menu screen in response to control signals from said keyboard means, and for causing the display means to graphically display images of one of a plurality of graphical depictions of EDM machining modes shown in said menu screen in response to a mode selection control signal received from said keyboard means selecting the same; and (2) means for prompting the user, through said display means, to enter numerical data values for said one of said plurality of graphical depictions, said means for prompting including graphically changing a video attribute of a portion of one of said plurality of graphical depictions to graphically instruct the user as to an EDM machining parameter expressed in numerical data, that the user should next through said keyboard means to enable EDM machining according to the selected one of said plurality of graphical depictions of EDM machining modes and repeating this process until all machining parameters associated with said one of said plurality of graphical depictions of EDM machining modes have been entered, and (3) means for supplying movement signals to said movement input to instruct said means for positioning with regard to moving said electrode according to said machining parameters entered and according to said graphically depicted one of said plurality of EDM machining modes wherein said workpiece is machined accordingly.

10. The apparatus of claim 9 wherein one of said plurality of graphical depictions of EDM machining modes includes a center zero mode screen wherein said processing means causes said display means to display a graphics image which pictorially instructs the user to enter movement control signals through said keyboard means, said means for supplying movement signals responding to said movement control signals and causing a corresponding movement signal to be supplied to said movement input.

11. The apparatus of claim 9 wherein one of said plurality of graphical depictions of EDM machining modes includes a continuous orbiting mode screen wherein the user is prompted by said means for prompting via graphical depictions of the continuous orbiting mode including at least one image of a relative machining path of the electrode displayed on said display means, the user being prompted thereby to enter numerical data values through said keyboard means for a maximum radius and a final depth which data values serve to define said machining path.

12. The apparatus of claim 9 wherein one of said plurality of graphical depictions of EDM machining modes includes an incremental orbiting mode screen wherein the user is prompted by said means for prompting via graphical depictions of the incremental orbiting mode including a first image and a second graphical image depicting the relative position of the electrode and the workpiece, and the relative machining paths of the electrode with respect to the workpiece in a plane defined by the x and y directions, and in the z axis direction, said machining paths being displayed on said display means, and the user being prompted thereby to enter numerical data values through said keyboard means which data values define a top radius, a bottom radius, radial step size, offset depth, final depth, and depth increment size machining parameters which parameters serve to define said machining paths.

13. The apparatus of claim 9 wherein one of said plurality of graphical depictions of EDM machining modes includes a vectoring mode screen wherein the user is prompted by said means for prompting via graphical depictions of the vectoring mode including at least one image depicting the relative position of the electrode and the workpiece, and the relative machining path of the electrode with respect to the workpiece in a plane defined by the x and y directions, and in the z axis direction, said machining paths being displayed on said display means, and the user being prompted thereby to enter numerical data values through said keyboard means which data values define a start angle, a top radius, a bottom radius, an offset depth, a final depth, and depth increments which parameters serve to define said machining paths.

14. The apparatus of claim 9 wherein:
said processor means includes a gap detector means connected to said workpiece and to said electrode for monitoring the voltage developed between said electrode and said workpiece to be machined, said gap detector means producing a retraction signal when a short is detected between said electrode and said workpiece; and
said processing means supplying a retraction signal to said means for moving in response to said retraction signal, said means for positioning being responsive to said retraction signal by moving said electrode in a direction substantially reversed as compared with the electrode movement which occurs as a result of said movement signals.

15. A vectoring and orbiting EDM machine comprising:
an electrode;
power supply means connected to said electrode for supplying a cutting voltage to said electrode;
display means for displaying graphics images and alphanumerical values in response to signals received at a display input of the display means;
keyboard means for entering data values and control signals;
processing means for inputting data values and control signals from said keyboard means and producing movement signals in response thereto, said processing means including:
(1) means connected to said display input for producing a signal and graphically, through said display means, displaying a plurality of graphics images including an EDM machining mode menu screen and graphically indicating a current menu selection from said menu screen in response to control signals from said keyboard means, said means for graphically displaying also producing images of one of a plurality of graphical depictions of EDM machining modes shown in said menu screen in response to a control signal selecting the same, (2) means for prompting the user, through said display means, to enter numerical data values for said one of said plurality of graphical depictions, said means for prompting including graphically changing a video attribute of a portion of one of said plurality of graphical depictions to graphically instruct the user as to an EDM machining parameter, expressed in numerical data, that the user should next enter through said keyboard means to enable EDM machining according to the selected one of said plurality of graphical depictions of EDM machining modes and repeating this process until all machining parameters associated with said one of said plurality of graphical depictions of EDM machining modes have been entered, and (3) means for producing movement signals according to said machining parameters entered and according to said graphically depicted one of said plurality of EDM machining modes; and means responsive to said movement signals for causing relative movement between said electrode and a workpiece to be machined in x-axis, y-axis and z-axis directions.

16. The apparatus of claim 15 wherein one of said plurality of graphical depictions of EDM machining modes includes a center zero mode screen wherein said processing means causes said display means to display a graphics image which pictorially instructs the user to enter movement control signals through said keyboard means, said means for supplying movement signals responding to said movement control signals and causing a corresponding movement signal to be supplied to said movement input.

17. The apparatus of claim 15 wherein one of said plurality of graphical depictions of EDM machining modes includes a continuous orbiting mode screen wherein the user is prompted by said means for prompting via graphical depictions of the continuous orbiting mode including at least one image of a relative machining path of the electrode displayed on said display means, the user being prompted thereby to enter numerical data values through said keyboard means for a maximum radius and a final depth which data values serve to define said machining path.

18. The apparatus of claim 15 wherein one of said plurality of graphical depictions of EDM machining modes includes an incremental orbiting mode screen wherein the user is prompted by said means for prompting via graphical depictions of the incremental orbiting mode including a first image and a second graphical image depicting the relative position of the electrode and the workpiece, and the relative machining paths of the electrode with respect to the workpiece in a plane defined by the x and y directions, and in the z axis direction, said machining paths being displayed on said display means, and the user being prompted thereby to enter numerical data values through said keyboard means which values define a top radius, a bottom radius, radial step size, offset depth, final depth, and depth increment size machining parameters which parameters serve to define said machining paths.

19. The apparatus of claim 15 wherein one of said plurality of graphical depictions of EDM machining modes includes a vectoring mode screen wherein the user is prompted by said means for prompting via graphical depictions of the vectoring mode including at least one image depicting the relative position of the electrode and the workpiece, and the relative machining path of the electrode with respect to the workpiece in a plane defined by the x and y directions, and in the z axis direction, said machining paths being displayed on said display means, and the user being prompted thereby to enter numerical data values through said keyboard means which data values define a start angle, a top radius, a bottom radius, an offset depth, a final depth, and depth increments which parameters serve to define said machining paths.

* * * * *

UNITED STATES PATENT AND TRADEMARK OFFICE
CERTIFICATE OF CORRECTION

PATENT NO. : 5,051,912
DATED : September 24, 1991
INVENTOR(S) : Lars Johanson et al.

It is certified that error appears in the above-identified patent and that said Letters Patent is hereby corrected as shown below:

In column 3, line 48, please delete "Figure 6 is a wiring diagram" and insert in lieu thereof --Figures 6(a)-6(d) are wiring diagrams--.

In column 3, line 49, please insert after "5" --wherein broken lines A-A, B-B and C-C are off-page connection guides indicating locations wherein a large schematic was separated to enable reproduction of the entire schematic in Figs. 6(a)-6(d)--.

In column 7, line 67, please delete "Figure 6 is a detailed Schematic" and insert in lieu thereof --Figures 6(a)-6(d) are detailed schematics--.

In column 18, line 50, please insert after "values" --in--.

In column 18, line 51, please delete "receiving" and insert in lieu thereof --received--.

In column 18, line 56, please delete "signal" and insert in lieu thereof --signals--.

In column 19, line 12, please insert after "next" --enter--.

UNITED STATES PATENT AND TRADEMARK OFFICE
CERTIFICATE OF CORRECTION

PATENT NO. : 5,051,912

DATED : September 24, 1991

INVENTOR(S) : Lars Johanson et al.

It is certified that error appears in the above-identified patent and that said Letters Patent is hereby corrected as shown below:

In column 22, line 12, please insert after "which" --data--.

Signed and Sealed this

Sixteenth Day of March, 1993

*Attest:*

STEPHEN G. KUNIN

*Attesting Officer*      *Acting Commissioner of Patents and Trademarks*